United States Patent
Fu et al.

(10) Patent No.: US 12,355,573 B2
(45) Date of Patent: Jul. 8, 2025

(54) METHOD, USER EQUIPMENT AND BASE STATION FOR TRANSMITTING HARQ-ACK INFORMATION

(71) Applicant: Samsung Electronics Co., Ltd., Suwon-si (KR)

(72) Inventors: Jingxing Fu, Beijing (CN); Bin Yu, Beijing (CN); Chen Qian, Beijing (CN); Qi Xiong, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/357,618

(22) Filed: Jul. 24, 2023

(65) Prior Publication Data

US 2023/0370208 A1    Nov. 16, 2023

Related U.S. Application Data

(63) Continuation of application No. 16/638,579, filed as application No. PCT/KR2018/010560 on Sep. 10, 2018, now abandoned.

(30) Foreign Application Priority Data

Sep. 8, 2017 (CN) .......................... 201710806037.7
Sep. 29, 2017 (CN) .......................... 201710911985.7

(51) Int. Cl.
*H04L 1/1812* (2023.01)
*H04L 5/00* (2006.01)
(Continued)

(52) U.S. Cl.
CPC .......... *H04L 1/1819* (2013.01); *H04L 5/0048* (2013.01); *H04W 72/21* (2023.01); *H04W 72/535* (2023.01); *H04W 76/30* (2018.02)

(58) Field of Classification Search
None
See application file for complete search history.

(56) References Cited

U.S. PATENT DOCUMENTS

| 9,241,342 B2 | 1/2016 | Lin et al. |
| 11,476,995 B2 | 10/2022 | Fu et al. |

(Continued)

FOREIGN PATENT DOCUMENTS

| CN | 102904698 A | 1/2013 |
| CN | 103873212 A | 6/2014 |

(Continued)

OTHER PUBLICATIONS

Chinese Office Action dated Apr. 20, 2023, issued in Chinese Application No. 201710806037.7.

(Continued)

*Primary Examiner* — Steve R Young
(74) *Attorney, Agent, or Firm* — Jefferson IP Law, LLP

(57) ABSTRACT

The present disclosure discloses a method, a user equipment and a base station for transmitting HARQ-ACK information, including: determining, the number of bits of HARQ-ACK information transmitted on an uplink subframe n and a PUCCH resource for transmitting the HARQ-ACK information; determining, a PUCCH power adjustment value transmitting the HARQ-ACK information according to a shared field of TPC and a total DL DAI in DCI of a PDCCH scheduling a PDSCH or indicating semi-static SPS release; transmitting, the HARQ-ACK information on the uplink subframe n according to the determined number of bits, the PUCCH resource, and the PUCCH power adjustment value; wherein the shared field of the TPC and the total DL DAI is just used to transmit a TPC command, or, the shared field of the TPC and the total DL DAI is used to transmit the TPC command or a value of the total DL DAI.

15 Claims, 9 Drawing Sheets

(51) Int. Cl.
*H04W 72/21* (2023.01)
*H04W 72/50* (2023.01)
*H04W 76/30* (2018.01)

(56) References Cited

U.S. PATENT DOCUMENTS

| | | | |
|---|---|---|---|
| 2011/0228863 A1* | 9/2011 | Papasakellariou | H04L 1/1864 375/259 |
| 2011/0243066 A1 | 10/2011 | Nayeb Nazar et al. | |
| 2011/0310819 A1 | 12/2011 | Liao | |
| 2011/0310820 A1* | 12/2011 | Liao | H04L 5/0094 370/329 |
| 2013/0194931 A1* | 8/2013 | Lee | H04W 72/04 370/329 |
| 2013/0215807 A1 | 8/2013 | Yang et al. | |
| 2013/0272157 A1 | 10/2013 | Gao et al. | |
| 2013/0322343 A1 | 12/2013 | Seo et al. | |
| 2015/0264678 A1 | 9/2015 | Yin et al. | |
| 2015/0280883 A1 | 10/2015 | Seo et al. | |
| 2016/0295561 A1 | 10/2016 | Papasakellariou | |
| 2017/0041923 A1* | 2/2017 | Park | H04L 5/0053 |
| 2017/0134140 A1 | 5/2017 | Park | |
| 2017/0223702 A1 | 8/2017 | Yin et al. | |
| 2017/0244532 A1 | 8/2017 | Lee et al. | |
| 2018/0006791 A1* | 1/2018 | Marinier | H04L 5/0055 |
| 2019/0110307 A1* | 4/2019 | Kim | H04W 74/0808 |
| 2019/0123879 A1 | 4/2019 | Wang et al. | |
| 2019/0393992 A1* | 12/2019 | Xiong | H04L 1/1812 |
| 2020/0374048 A1* | 11/2020 | Lei | H04L 1/1896 |
| 2022/0038215 A1 | 2/2022 | Fu et al. | |

FOREIGN PATENT DOCUMENTS

| | | |
|---|---|---|
| CN | 105846977 A | 8/2016 |
| CN | 106160957 A | 11/2016 |
| CN | 106301702 A | 1/2017 |
| EP | 3780717 A1 | 2/2021 |
| EP | 3832929 A1 | 6/2021 |
| EP | 3 806 367 B1 | 11/2022 |
| WO | 2016/123372 A1 | 8/2016 |
| WO | 2016/182405 A1 | 11/2016 |
| WO | 2017/028001 A1 | 2/2017 |
| WO | 2017/044066 A1 | 3/2017 |

OTHER PUBLICATIONS

Chinese Notice of Allowance dated Oct. 19, 2023, issued in Chinese Application No. 201710806037.7.
LG Electronics, "Support of HARQ-ACK multiplexing/bundling for NR", R1-1713194, 3GPP TSG RAN WG1 Meeting #90, Prague, Czechia, Aug. 12, 2017 See section 2.2.
Fujitsu, "Discussion on HARQ-ACK Codebook", R1-1712746, 3GPP TSG RAN WG1 Meeting #90, Prague, Czech Republic, Aug. 11, 2017 See section 2; and figures 1-3.
Samsung, 'HARQ-ACK codebook determination', R1-1713645, 3GPP TSG RAN WG1 Meeting #90, Prague, Czechia, Aug. 11, 2017 See sections 2.1-2.3.
Samsung, "CR to 38.213 capturing the NR ad-hoc 1801 and RAN1#92 meeting agreements", 3GPP Draft, 38213_CR0001_(REL-15)_R1-1803554, 3rd Generation Partnership Project (3GPP), Mobile Competence Centre; 650, Route Des Lucioles, F-06921 Sophia-Antipolis Cedex, France, vol. RAN WG1, Athens, Greece, Feb. 26-Mar. 1, 2018, Mar. 15, 2018, XP051509057.
Samsung, "Corrections on CA operation", 3GPP Draft, R1-1806740_CA_V2, 3rd Generation Partnership Project (3GPP), Mobile Competence Centre; 650, Route Des Lucioles, F-06921 Sophia-Antipolis Cedex, France, vol. RAN WG1, Busan, Korea, May 21-May 25, 2018, May 20, 2018, XP051441942.
Extended European search report dated Aug. 28, 2020, issued in European Patent Application No. 18854653.5.
European Search Report dated May 12, 2022; European Appln. No. 18 854 653.5-1216.
Chinese Office Action with English translation dated Sep. 5, 2022; Chinese Appln. No. 201710806037.7.
LG Electronics; Support of HARQ-ACK multiplexing/bundling for NR; 3GPP TSG RAN WG1 Meeting NR Ad-Hoc#2; R1-1710333; Jun. 27-30, 2017; Qingdao, P.R. China.
Chinese Office Action with English translation dated Oct. 31, 2022; Chinese Appln. No. 201710911985.7.
European Search Report dated Jan. 4, 2023; European Appln. No. 18 854 653.5-1216.
Chinese Notice of Allowance dated Dec. 25, 2023, issued in Chinese Patent Application No. 201710911985.7.
Extended European Search Report dated Jan. 11, 2024, issued in European Patent Application No. 23197542.6.
Indian Office Action dated Mar. 11, 2024, issued in Indian Patent Application No. 202027013375.
AT&T; HARQ-ACK feedback timing for FDD, semi-static TDD and mini-slot based transmissions; 3GPP TSG RAN WG1 NR Ad-Hoc#2; R1-1710418, Jun. 17, 2017.
Samsung; HARQ-ACK Feedback with Flexible Timing; 3GPP TSG RAN WG1 Nr Ad-Hoc Meeting; R1-1700957, Jan. 16, 2017, Spokane, USA.
Fujitsu, Review of proposals for HARQ-ACK codebook determination, R1-155153, 3GPP TSG RAN WG1 Meeting #82bis, Sep. 25, 2015, Malmo, Sweden.
Korean Office Action dated Jul. 24, 2024, issued in Korean Application No. 10-2020-7009671.

* cited by examiner

【Figure 1】
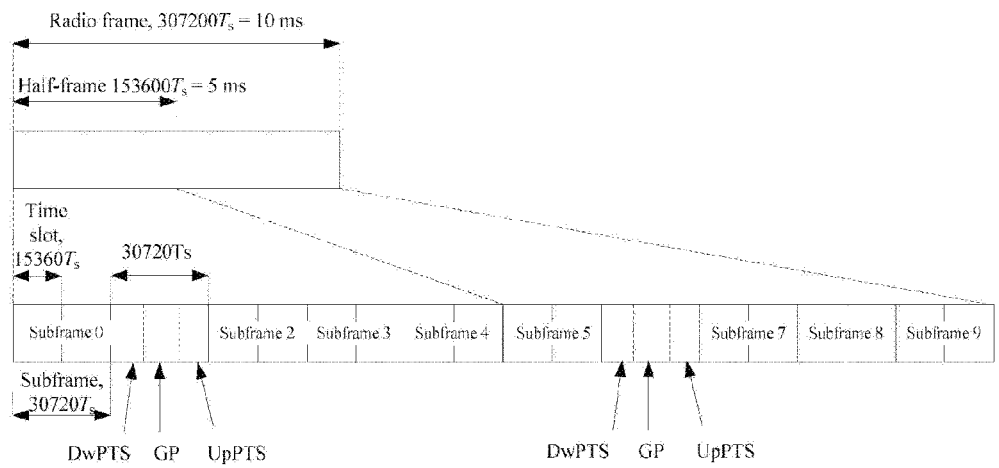
【Figure 2】
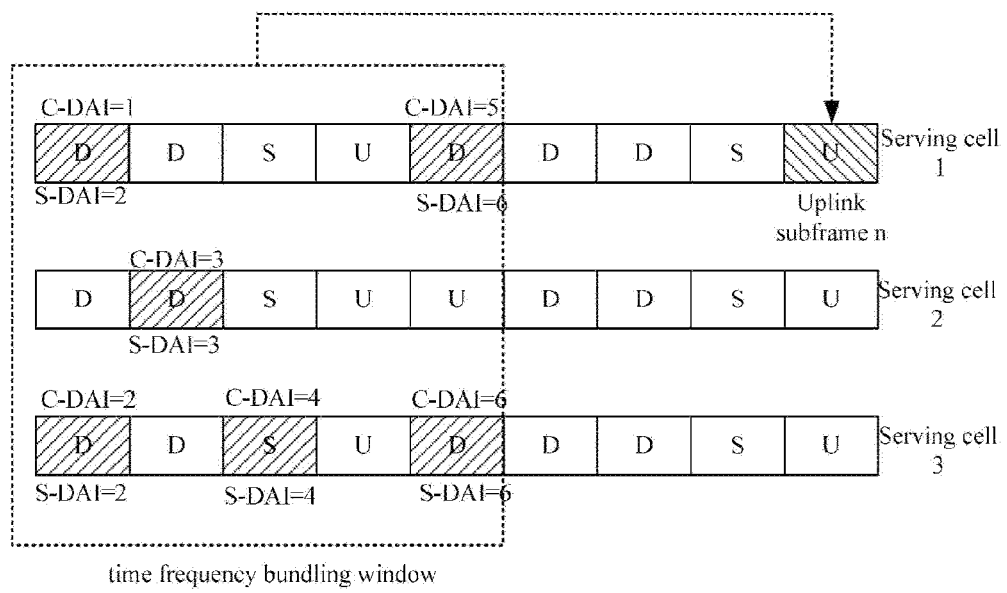

[Figure 3]
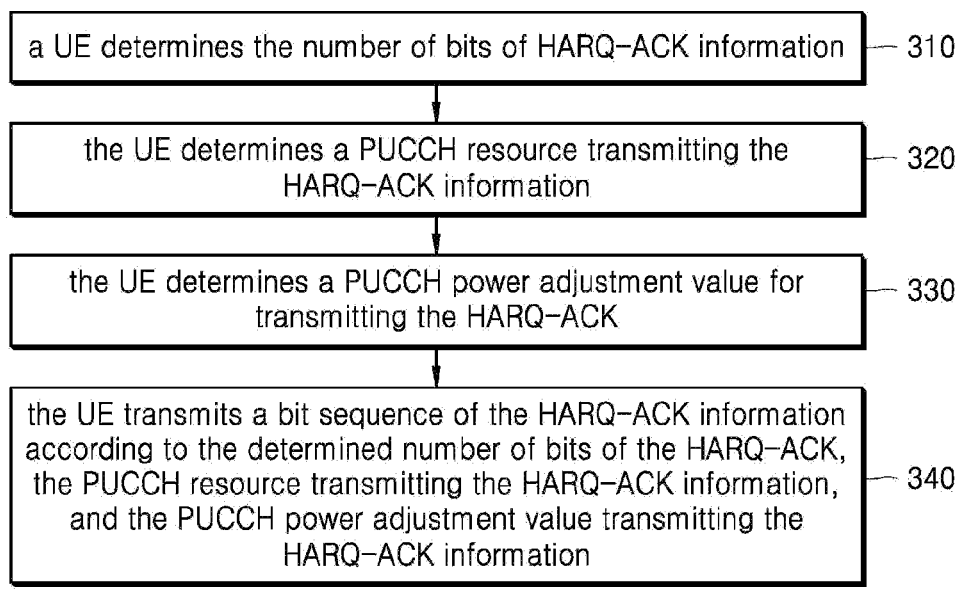
[Figure 4]
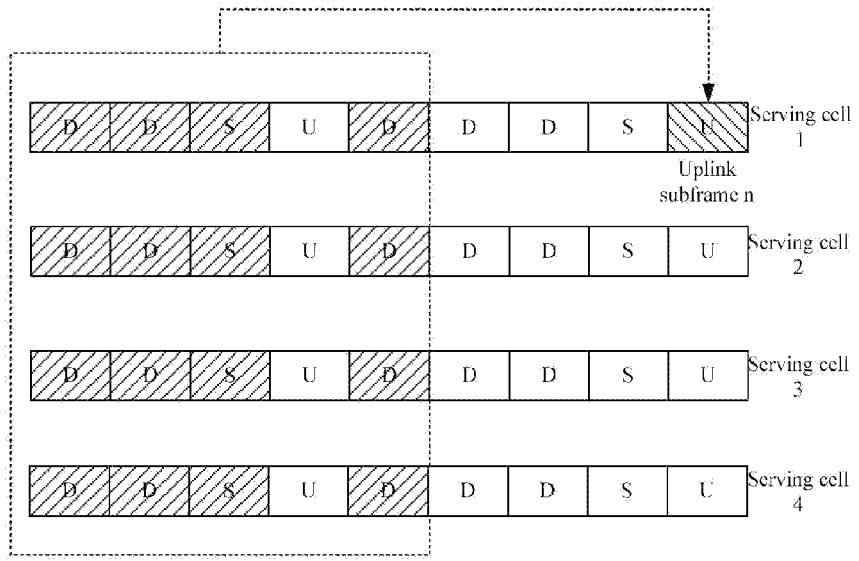

[Figure 5]
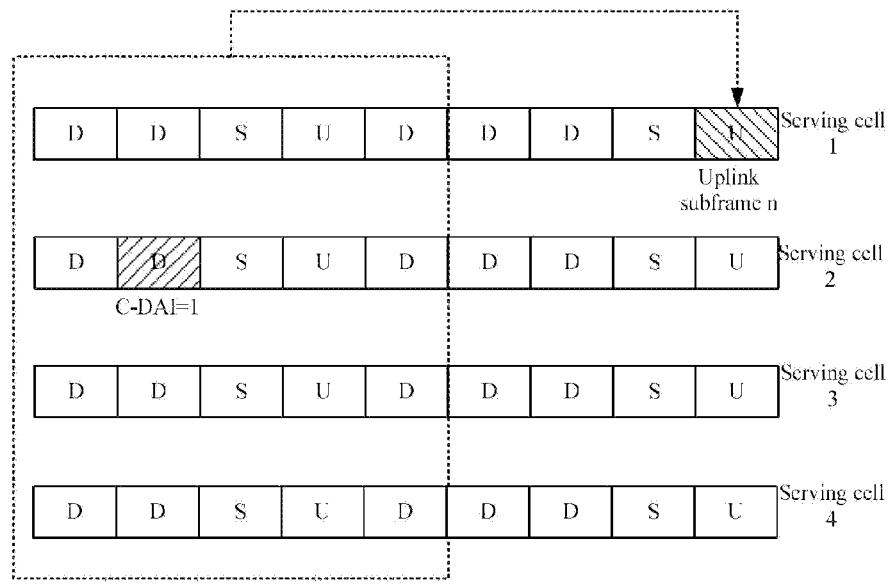
[Figure 6]
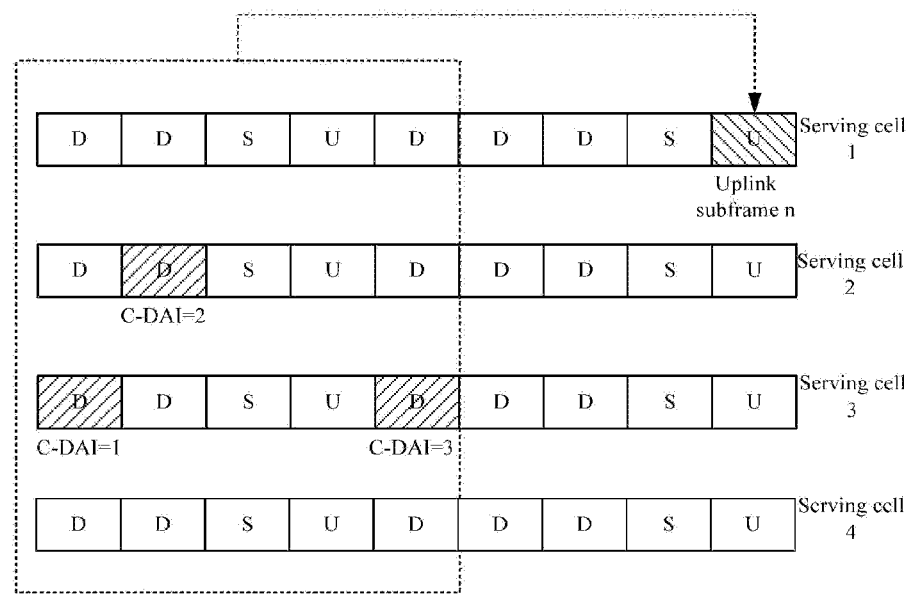

【Figure 7】
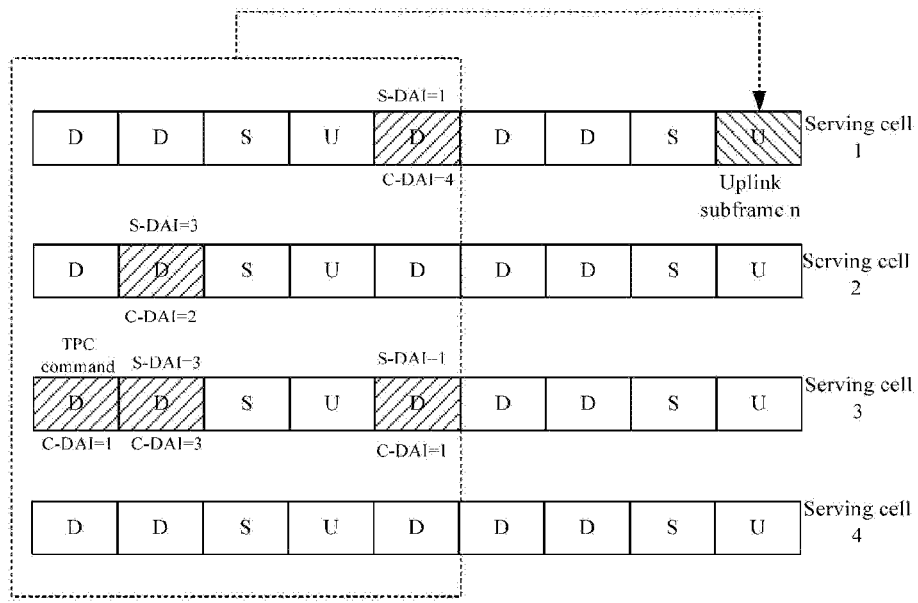
【Figure 8】
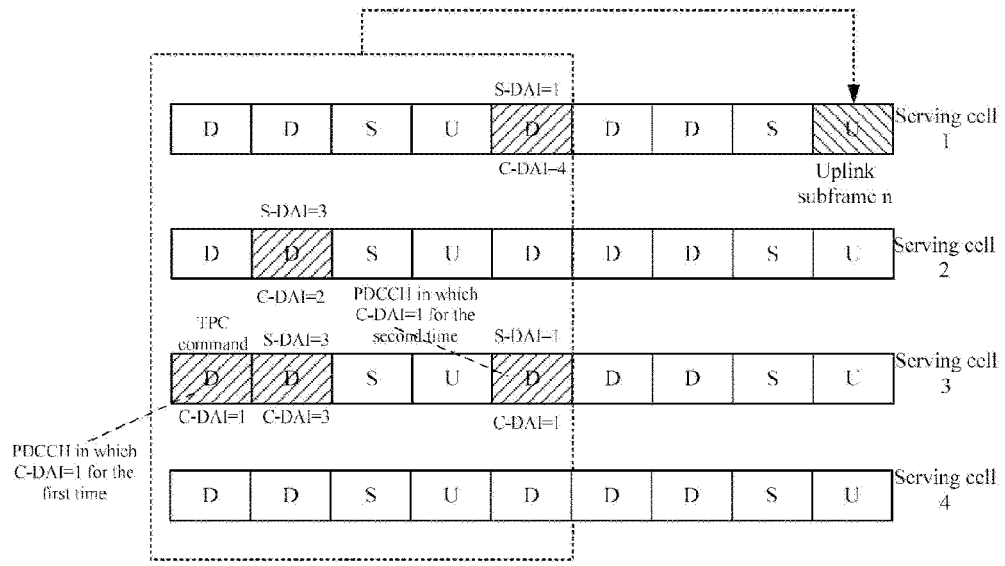

【Figure 9】
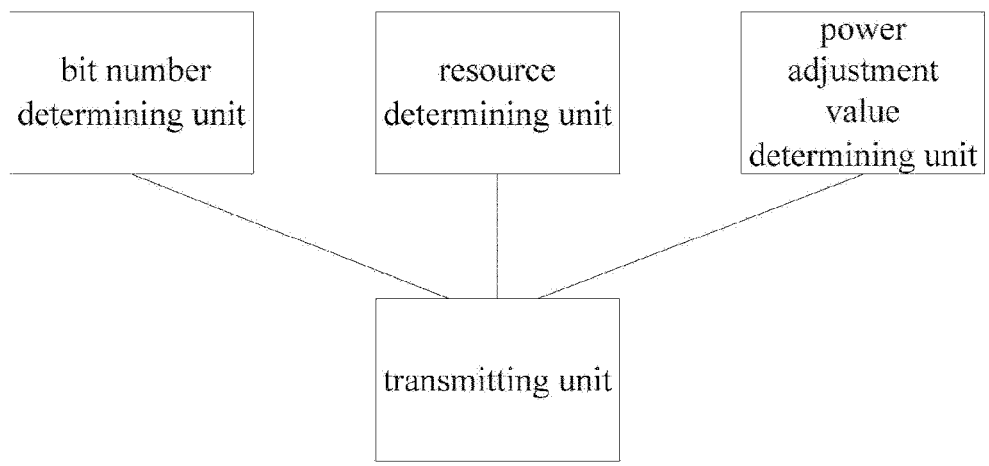
【Figure 10】
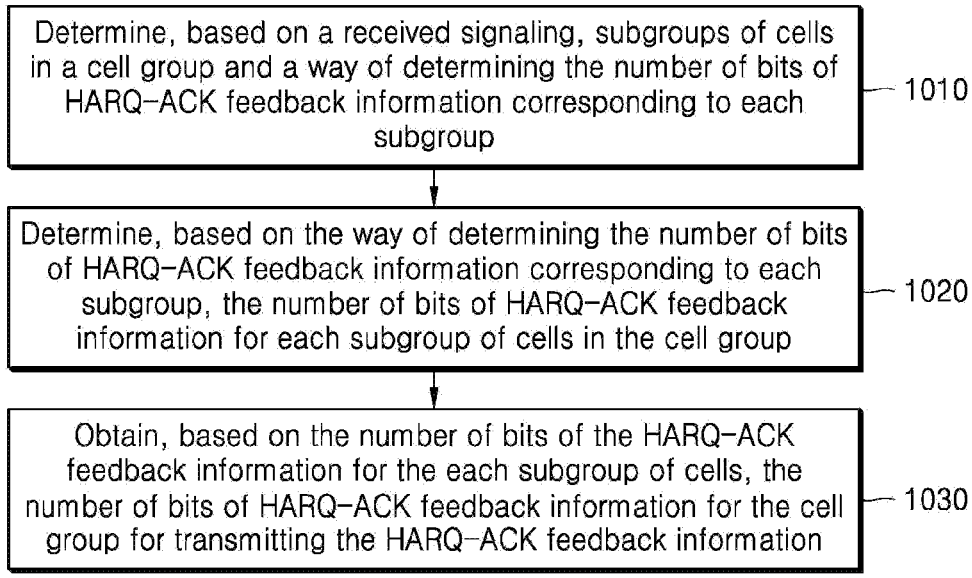

[Figure 11]
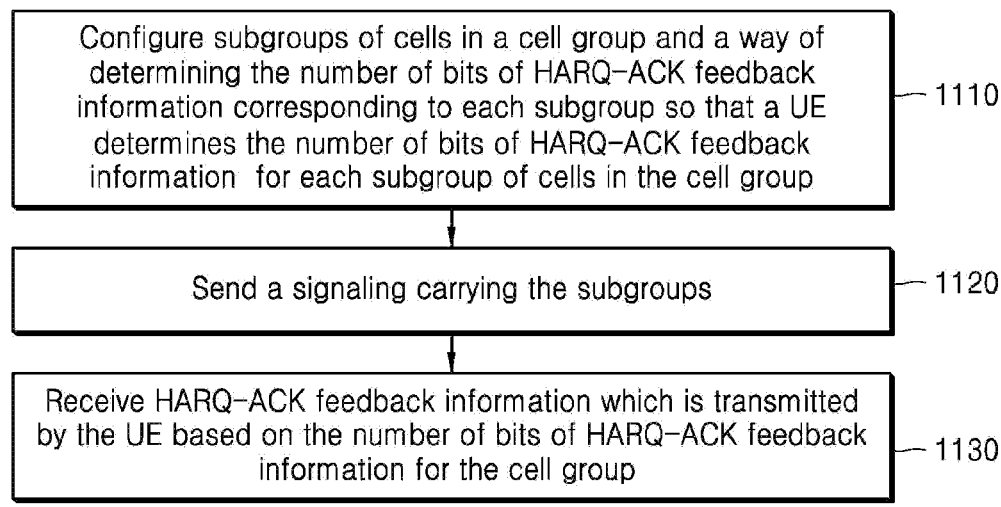
[Figure 12]
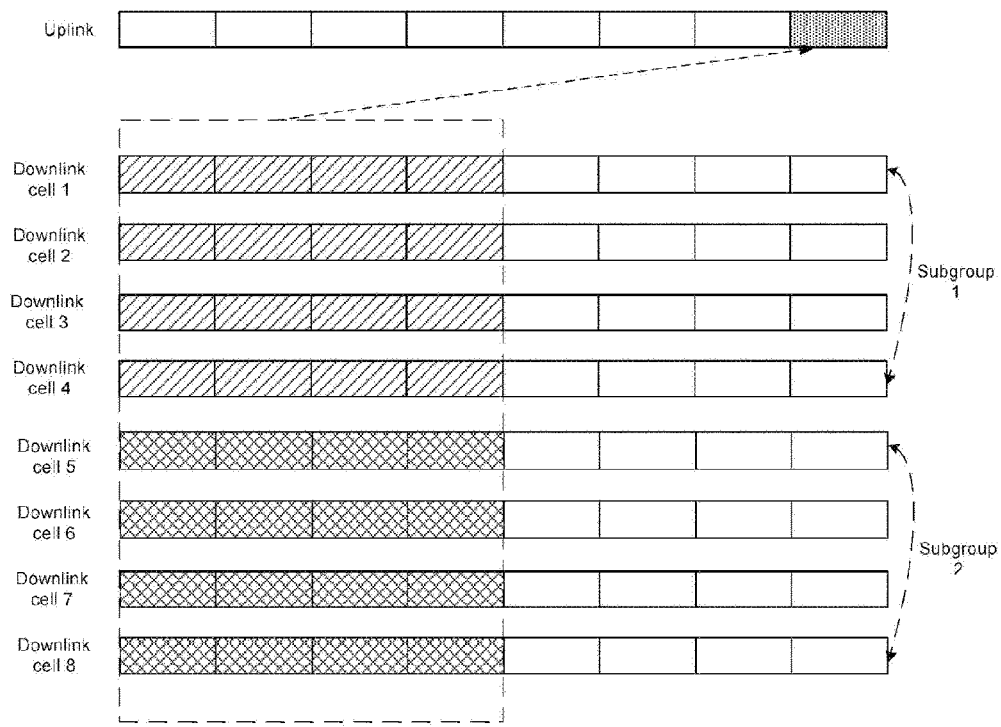

【Figure 13】
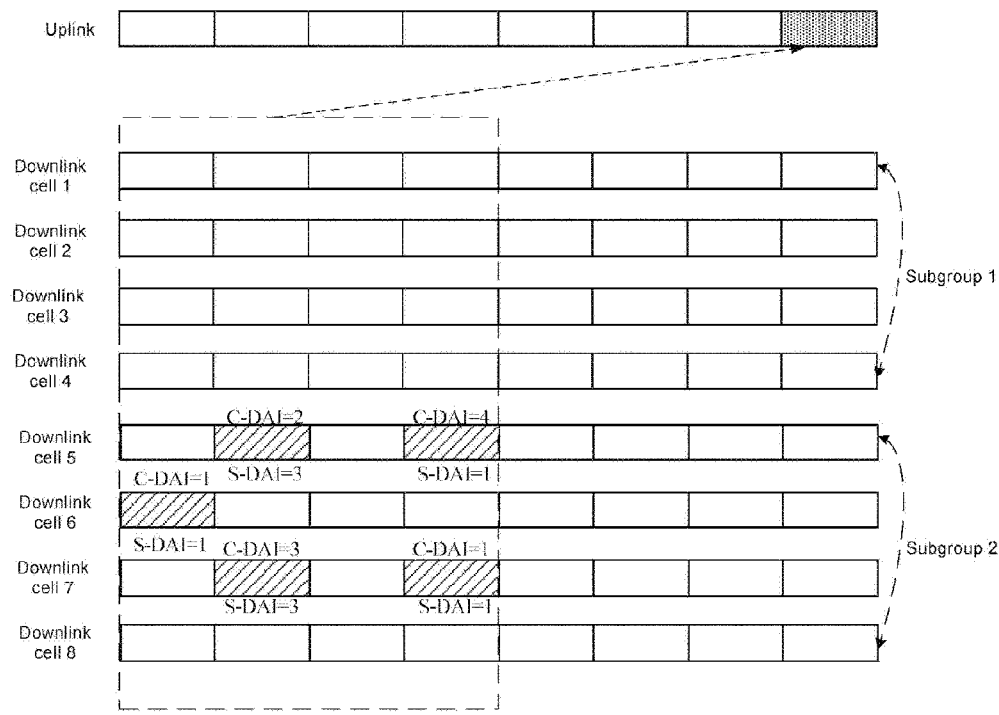
【Figure 14】
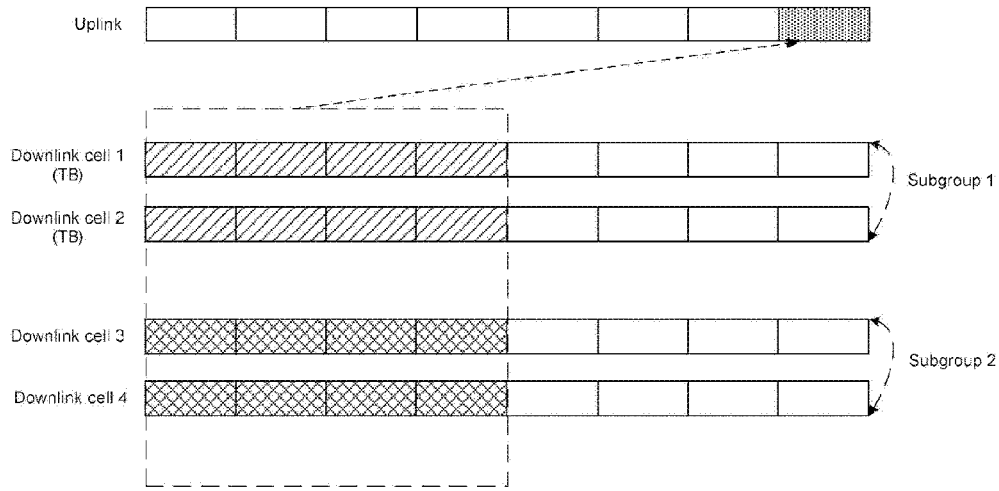

【Figure 15】
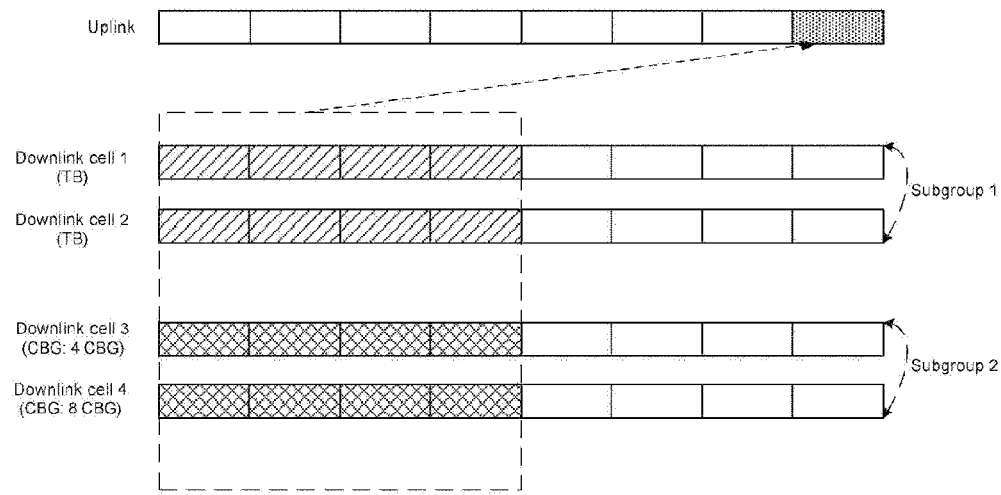
【Figure 16】
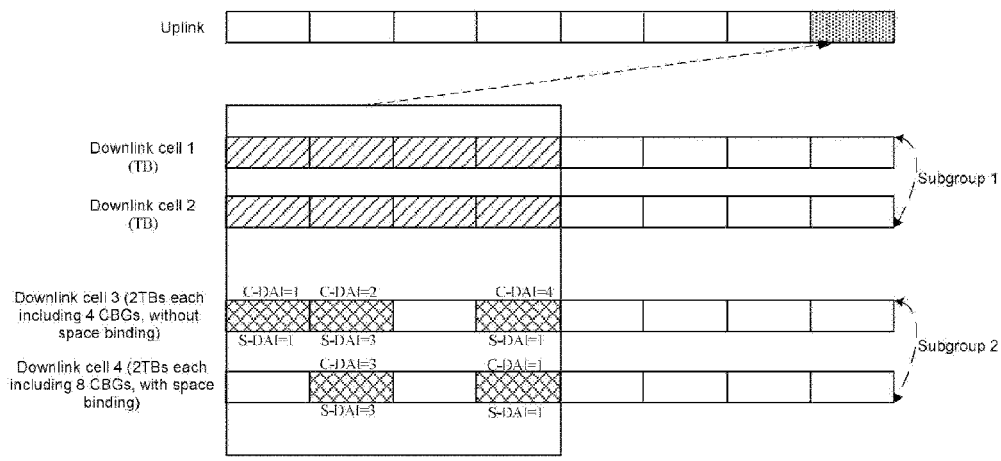
【Figure 17】
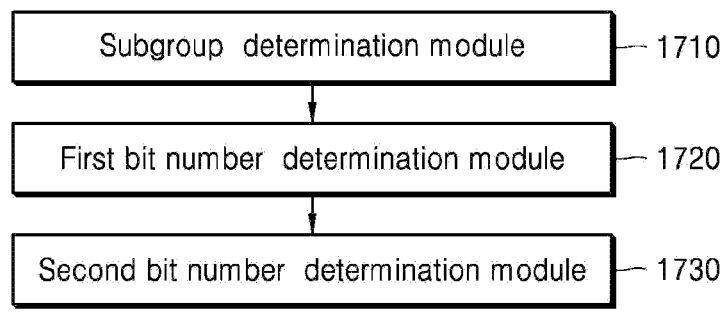

[Figure 18]
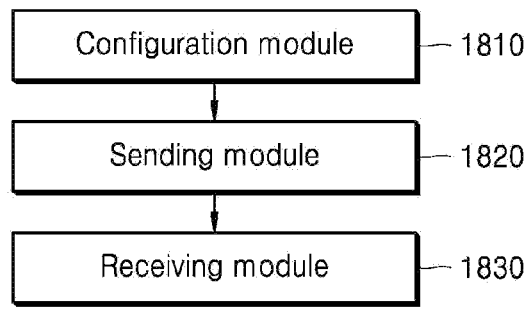
[Figure 19]
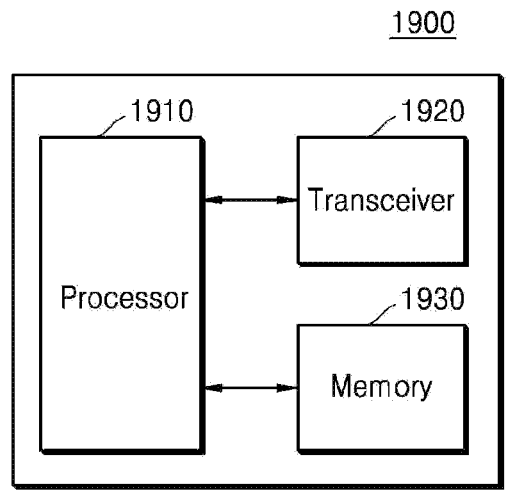
[Figure 20]
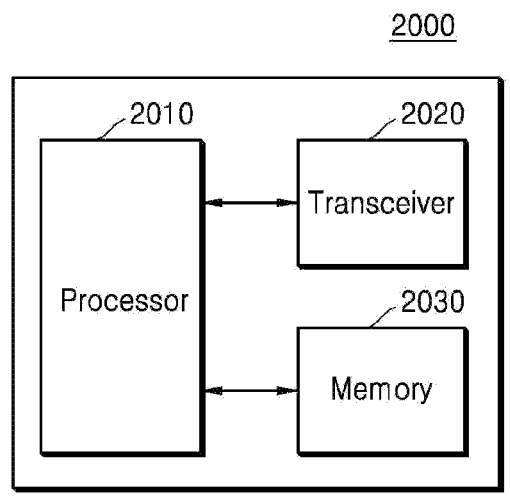

METHOD, USER EQUIPMENT AND BASE STATION FOR TRANSMITTING HARQ-ACK INFORMATION

CROSS-REFERENCE TO RELATED APPLICATION(S)

This application is a continuation application of prior application Ser. No. 16/638,579, filed on Feb. 12, 2020, which is based on and claims priority of a U.S. National Stage application under 35 U.S.C. § 371 of an International application number PCT/KR2018/010560, filed on Sep. 10, 2018, which is based on and claims priority of a Chinese patent application number 201710806037.7, filed on Sep. 8, 2017, in the Chinese Intellectual Property Office, and of a Chinese patent application number 201710911985.7, filed on Sep. 29, 2017, in the Chinese Intellectual Property Office, the disclosure of which is incorporated by reference herein in its entirety.

TECHNICAL FIELD

The present disclosure relates to radio communications system technologies, and particularly to a method, user equipment and base station for transmitting HARQ-ACK information.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE

Technical Solution

The present disclosure discloses a method and device for transmitting HARQ-ACK information, which can effectively transmit a TPC command.

DESCRIPTION OF DRAWINGS

The above and/or additional aspects and advantageous of the present disclosure will become apparent and be more readily appreciated from the following descriptions of embodiments, with reference to the accompanying drawings, in which:

FIG. 1 is a schematic diagram illustrating frame structure in a conventional TDD system;

FIG. 2 is a schematic diagram illustrating two conventional DL DALs;

FIG. 3 is a flowchart illustrating a method for transmitting HARQ-ACK information;

FIG. 4 is a first schematic diagram illustrating the number of bits of the HARQ-ACK transmitted in an uplink timeslot in accordance with Embodiment 1 of the present disclosure;

FIG. 5 is a second schematic diagram illustrating the number of bits of the HARQ-ACK transmitted in an uplink timeslot in accordance with Embodiment 1 of the present disclosure;

FIG. 6 is a third schematic diagram illustrating the number of bits of the HARQ-ACK transmitted in an uplink timeslot in accordance with Embodiment 1 of the present disclosure;

FIG. 7 is a schematic diagram illustrating the number of bits of the HARQ-ACK transmitted in an uplink timeslot in accordance with Embodiment 2 of the present disclosure;

FIG. 8 is a schematic diagram illustrating the counter DL DAI and the total DL DAI in accordance with Embodiment 2 of the present disclosure;

FIG. 9 is a schematic diagram illustrating structure of a device for transmitting HARQ-ACK information;

FIG. 10 is a schematic flowchart of a method for determining the number of bits of HARQ-ACK information according to embodiments of the present disclosure;

FIG. 11 is a schematic flowchart of a method for configuring the number of bits of HARQ-ACK information according to embodiments of the present disclosure;

FIG. 12 is an instance diagram of semi-statically determining the number of bits of the HARQ-ACK information according to Embodiment 3;

FIG. 13 is an instance diagram of dynamically determining the number of bits of the HARQ-ACK information according to Embodiment 3;

FIG. 14 is an instance diagram of semi-statically determining the number of bits of the HARQ-ACK information according to Embodiment 4;

FIG. 15 is an instance diagram of determining the number of bits of the HARQ-ACK information without spacial bundling according to Embodiment 4;

FIG. 16 is an instance diagram of dynamically determining the number of bits of the HARQ-ACK information after spacial bundling according to Embodiment 4;

FIG. 17 is a schematic block diagram of a user equipment according to embodiments of the present disclosure; and FIG. 18 is a schematic block diagram of a base station according to embodiments of the present disclosure.

FIG. 19 is a block diagram illustrating the structure of a user equipment according to another embodiment of the present disclosure.

FIG. 20 is a block diagram illustrating the structure of a base station according to another embodiment of the present disclosure.

BEST MODE

The present disclosure discloses a method and device for transmitting HARQ-ACK information, which can effectively transmit a TPC command.

To overcome the technical problems or at least partially solve the technical problems, the following technical solutions are provided.

A method for transmitting Hybrid Automatic Repeat request-Acknowledgment (HARQ-ACK) information, includes: determining, by a user equipment (UE), the number of bits of HARQ-ACK information transmitted on an uplink subframe n and a Physical Uplink Control Channel (PUCCH) resource for transmitting the HARQ-ACK information; determining, by the UE, a PUCCH power adjustment value transmitting the HARQ-ACK information according to a shared field of Transmission Power Control (TPC) and a total Downlink (DL) Downlink Assignment Index (DAI) in DL Downlink Control Information (DCI) of a Physical Downlink Control Channel (PDCCH) scheduling a Physical Downlink Shared Channel (PDSCH) or indicating semi-static Semi-Persistent Scheduling (SPS) release; transmitting, by the UE, the HARQ-ACK information on the uplink subframe n according to the determined number of bits, the PUCCH resource, and the PUCCH power adjustment value; wherein the shared field of the TPC and the total DL DAI is just used to transmit a TPC command, or, the shared field of the TPC and the total DL DAI is used to transmit the TPC command or a value of the total DL DAI, n is a subframe index.

Preferably, when the total DL DAI exists in the DL DCI, the shared field of the TPC and the total DL DAI is used to transmit the TPC command or the value of the total DL DAI; and/or, when the total DL DAI does not exist in the DL DCI, the shared field of the TPC and the total DL DAI is just used to transmit the TPC command.

Preferably, when the shared field of the TPC and the total DL DAI is just used to transmit the TPC command, the determining the PUCCH power adjustment value according to the shared field of the TPC and the total DL DAI includes: when the DL DAI field exists in the PDCCH, determining, by the UE, information carried in a specified shared field of the TPC and the total DL DAI in all of received PDCCHs as the TPC command, and a remaining shared field of the TPC and the total DL DAI as a reserved field; and/or, when the DL DAI field does not exist in the PDCCH, determining, by the UE, information carried in shared fields of the TPC and the total DL DAI in all of received PDCCHs of all serving cells as the TPC command; or, determining information carried in a specified shared field of the TPC and the total DL DAI in all of received PDCCHs as the TPC command, and a remaining shared field of the TPC and the total DL DAI as a reserved field.

Preferably, when the DL DAI field exists in the PDCCH, the specified shared field of the TPC and the total DL DAI is a shared field of the TPC and the total DL DAI in a received PDCCH of which a counter DL DAI is equal to 1 for the first time, wherein a serving cell where the received PDCCH is located is a primary cell, a primary secondary cell, or a secondary cell; or the specified shared field of the TPC and the total DL DAI is all of shared fields of the TPC and the total DL DAI in all PDCCHs received by the UE; and/or, when the DL DAI field does not exist in the PDCCH, the specified shared field of the TPC and the total DL DAI is a shared field of the TPC and the total DL DAI in a received PDCCH of which a serving cell is a primary cell or a primary secondary cell.

Preferably, when the shared field of the TPC and the total DL DAI is used to transmit the TPC command or the value of the total DL DAI, the determining the PUCCH power adjustment value according to the shared field of the TPC and the total DL DAI includes: determining, by the UE, information carried in a specified shared field of the TPC and the total DL DAI in all of received PDCCHs as the TPC command, and information carried in a remaining shared field of the TPC and the total DL DAI as the value of the total DL DAI.

Preferably, the specified shared field of the TPC and the total DL DAI is a shared field of the TPC and the total DL DAI in a received PDCCH of which a counter DL DAI is equal to 1 for the first time, wherein a serving cell where the received PDCCH is located is a primary cell, a primary secondary cell, or a secondary cell.

Preferably, the determining the number of bits of the HARQ-ACK information includes: according to manner one, determining, by the UE, a set of all of downlink timeslots that need to transmit the HARQ-ACK information in the uplink subframe n through receiving high-layer signaling configuration, and determining the number of bits of the HARQ-ACK information transmitted on the uplink subframe n according to a transmission mode configured for the set or each serving cell; or, according to manner two, determining, by the UE, the number of bits of the HARQ-ACK information according to the counter DL DAI and the total DL DAI in the received PDCCH;

or, selecting, by the UE, one manner from the manner one and the manner two according to the received high-layer signaling to determine the number of bits of the HARQ-ACK information.

Preferably, the determining the number of bits according to the transmission mode configured for the set or each serving cell includes: if the DL DAI field exists in the PDCCH, when the UE determines that HARQ-ACK information of one downlink timeslot of one serving cell is transmitted on the uplink subframe n, determining the number of bits of the HARQ-ACK information is q; when the UE determines that HARQ-ACK information of at least two downlink timeslots is transmitted on the uplink subframe n, determining the total number of bits of HARQ-ACK information corresponding to all of downlink timeslots included in the set as the determined number of bits of the HARQ-ACK information, and the bits of the HARQ-ACK information transmitted on the uplink subframe n are arranged in an ascending order of counter DL DAIs; if the DL DAI field does not exist in the PDCCH, determining the total number of bits of HARQ-ACK information corresponding to all of downlink timeslots included in the set as the determined number of bits of the HARQ-ACK information, and the bits of the HARQ-ACK information transmitted on the uplink subframe n are arranged in an order of timeslots and serving cells; wherein q is determined according to a transmission mode of the serving cell.

Preferably, the determining the number of bits of the HARQ-ACK information according to the counter DL DAI and the total DL DAI includes: when the UE determines that HARQ-ACK information of one downlink timeslot of one serving cell is transmitted on the uplink subframe n, determining the number of bits of the HARQ-ACK information is q, and information carried in the shared field of the TPC and the total DL DAI of the PDCCH is the TPC command; when the UE determines that HARQ-ACK information of at least two downlink timeslots is transmitted on the uplink subframe n, determining the number of bits of the HARQ-ACK information according to the counter DL DAI and the total DL DAI, wherein information carried in a shared field of the TPC and the total DL DAI in the first PDCCH received in the first timeslot is the TPC command, and information carried in a shared field of the TPC and the total DL DAI in a PDCCH received in other timeslot is the value of the total DL DAI.

Preferably, the determining the PUCCH resource for transmitting the HARQ-ACK information includes: determining a PUCCH resource set according to high-layer signaling configuration or a system information indication, and determining a PUCCH resource from the PUCCH resource set according to an HARQ-ACK Resource Indicator (ARI) field as the PUCCH resource for transmitting the HARQ-ACK information; wherein the ARI field is just used to transmit ARI information.

A device for transmitting Hybrid Automatic Repeat request-Acknowledgment (HARQ-ACK) information, includes: a bit number determining unit, a resource determining unit, a power adjustment value determining unit, and a transmitting unit; wherein the bit number determining unit is configured to determine the number of bits of HARQ-ACK information transmitted on an uplink subframe n; the resource determining unit is configured to determine a Physical Uplink Control Channel (PUCCH) resource for transmitting the HARQ-ACK information; the power adjustment value determining unit is configured to determine a PUCCH power adjustment value for transmitting the HARQ-ACK information according to a shared field of Transmission Power Control (TPC) and a total Downlink (DL) Downlink Assignment Index (DAI) in DL Downlink Control Information (DCI) of a Physical Downlink Control Channel (PDCCH) scheduling a Physical Downlink Shared Channel (PDSCH) or indicating semi-static Semi-Persistent Scheduling (SPS) release; and the transmitting unit is configured to transmit the HARQ-ACK information on the uplink subframe n according to the determined number of bits, the PUCCH resource, and the PUCCH power adjustment value; wherein the shared field of the TPC and the total DL DAI is just used to transmit a TPC command, or the shared field of the TPC and the total DL DAI is used to transmit the TPC command or a value of the total DL DAI, n is a subframe index.

As can be seen from the above technical solution, the method for transmitting HARQ-ACK information provided by the present disclosure can save signaling overhead by using different shared fields of the TPC and the total DL DAI as the TPC and the total DL DAI in accordance with different methods of determining the number of bits of the HARQ-ACK information.

The present disclosure provides a method for transmitting HARQ-ACK feedback information, the method includes: determining, based on a received signaling, subgroups of cells in a cell group and a way of determining the number of bits of HARQ-ACK feedback information corresponding to each subgroup; determining, based on the way of determining the number of bits of HARQ-ACK feedback information corresponding to each subgroup, the number of bits of HARQ-ACK feedback information for each subgroup of cells in the cell group; and obtaining, based on the number of bits of the HARQ-ACK feedback information for the each subgroup of cells, the number of bits of HARQ-ACK feedback information for the cell group for transmitting the HARQ-ACK feedback information.

Wherein, the way of determining the number of bits of HARQ-ACK feedback information includes at least one of the following: semi-statically determining the number of bits of the HARQ-ACK feedback information; and dynamically determining the number of bits of the HARQ-ACK feedback information.

Further, when the number of bits of the HARQ-ACK feedback information is dynamically determined, the number of bits of HARQ-ACK feedback information corresponding to downlink time slots for cells configured to be bound in the subgroups is bound.

In the practical application, the step of determining, based on a received signaling, subgroups of cells in a cell group and a way of determining the number of bits of HARQ-ACK feedback information corresponding to each subgroup includes: dividing cells in a cell group into two subgroups based on the received signaling, semi-statically determining the number of bits of HARQ-ACK feedback information for the first subgroup, and dynamically determining the number of bits of HARQ-ACK feedback information for the second subgroup.

Specifically, the step of semi-statically determining the number of bits of HARQ-ACK feedback information for the first subgroup includes: acquiring the number of cells in the subgroup, the number of downlink time slots for each cell transmitting HARQ-ACK feedback information in a same uplink time slot and the number of bits of HARQ-ACK feedback information corresponding to each downlink time slot; and calculating, based on the number of cells, the number of downlink time slots for each cell and the number of bits of HARQ-ACK feedback information corresponding to each downlink time slot, the number of bits of the HARQ-ACK feedback information for the subgroup.

Specifically, the step of dynamically determining the number of bits of HARQ-ACK feedback information for the second subgroup includes: determining, based on DL Downlink Assignment Indexes (DAIs) in received Physical Downlink Control Channels (PDCCHs), the total number of received PDCCHs; and calculating, based on the number of PDCCHs and the number of bits of HARQ-ACK feedback information corresponding to each configured PDCCH, the number of bits of the HARQ-ACK feedback information for the subgroup.

Further, the method further includes: bundling, based on the received signaling, the number of bits of HARQ-ACK feedback information corresponding to downlink time slots for cells which may be bound in the first subgroup.

Further, the method further includes: bundling, based on the received signaling, the number of bits of HARQ-ACK feedback information corresponding to downlink time slots for cells configured to be bound in the second subgroup.

The present disclosure further provides a method for configuring HARQ-ACK feedback information, the method includes: configuring subgroups of cells in a cell group and a way of determining the number of bits of HARQ-ACK feedback information corresponding to each subgroup so that a UE determines the number of bits of HARQ-ACK feedback information for each subgroup of cells in the cell group; sending a signaling carrying the subgroups; and receiving HARQ-ACK feedback information which is transmitted by the UE based on the number of bits of HARQ-ACK feedback information for the cell group.

Specifically, the configuring a way of subgrouping cells in a cell group includes: dividing cells in a cell group into two subgroups; configuring to semi-statically determine the number of bits of HARQ-ACK feedback information for the first subgroup; and configuring to dynamically determine the number of bits of HARQ-ACK feedback information for the second subgroup.

Further, the method includes: determining, based on the number of bits corresponding to downlink time slots for each cell, cells in which the number of bits of HARQ-ACK feedback information needs to be bound by the UE; and the configuring subgroups of cells in a cell group includes: configuring cells which may be bound in the first subgroup; and configuring cells to be bound in the second subgroup.

The present disclosure further provides a user equipment, the user equipment includes: a subgroup determination module configured to determine, based on a received signaling, subgroups of cells in a cell group and a way of determining the number of bits of HARQ-ACK feedback information corresponding to each subgroup; a first bit number determination module configured to determine, based on the way of determining the number of bits of HARQ-ACK feedback information corresponding to each subgroup, the number of bits of HARQ-ACK feedback information for each subgroup of cells in the cell group; and a second bit number determination module configured to obtain, based on the number of bits of the HARQ-ACK feedback information for the each subgroup of cells, the number of bits of HARQ-ACK feedback information for the cell group for transmitting the HARQ-ACK feedback information.

The present disclosure further provides a base station, the base station includes: a configuration module configured to configure subgroups of cells in a cell group and a way of determining the number of bits of HARQ-ACK feedback information corresponding to each subgroup so that a UE determines the number of bits of HARQ-ACK feedback information for each subgroup of cells in the cell group; a sending module configured to send a signaling carrying the subgroups; and a receiving module configured to receive HARQ-ACK feedback information which is transmitted by the UE based on the number of bits of HARQ-ACK feedback information for the cell group.

It can be known from the technical solutions that, in the technical solutions of the present disclosure, subgroups of cells in a cell group and a way of determining the number of bits of HARQ-ACK feedback information corresponding to each subgroup are determined based on a received signaling, for example, a method for semi-statically determining the number of bits of the HARQ-ACK feedback information can be used for some of cells, and a method for dynamically determining the number of bits of the HARQ-ACK feedback information is used for other cells, so that it is unnecessary to configure cells to be the same and have a large number of bits for transmitting based on the existing technologies; the number of bits of HARQ-ACK feedback information for each subgroup of cells in the cell group is determined based on the way of determining the number of bits of HARQ-ACK feedback information corresponding to each subgroup; and the number of bits of HARQ-ACK feedback information for the cell group is obtained based on the number of bits of the HARQ-ACK feedback information for the each subgroup of cells for transmitting the HARQ-ACK feedback information. The extra number of bits of HARQ-ACK feedback information is reduced, and resources for PUCCH for transmitting HARQ-ACK feedback information are saved.

Additional aspects and advantages of the present disclosure will be partially appreciated and become apparent from the descriptions below, or will be well learned from the practices of the present disclosure.

MODE FOR INVENTION

Hereinafter, embodiments of the present disclosure are described in detail with reference to accompanying drawings, so as to make the objective, technical solution, and merits of the present disclosure more apparent.

Embodiments of the present disclosure will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present disclosure and should not be regarded as any limitations thereto.

It should be understood by one person of ordinary skill in the art that singular forms "a", "an", "the", and "said" may be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood, the term "and/or" as used herein includes all or any of one or more associated listed items or combinations thereof.

It should be understood by one person of ordinary skill in the art that, unless otherwise defined, all terms (including technical and scientific terms) used herein have the same meaning as commonly understood by one person of ordinary skill in the art to which the present disclosure belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by one person of ordinary skill in the art that the term "equipment" as used herein includes not only devices with a wireless signal receiver having no emission capability but also devices with receiving and emitting hardware capable of carrying out bidirectional communication over a bidirectional communication link. Such devices can comprise cellular or other communication devices with a single-line display or multi-line display or without a multi-line display; Personal Communication Systems (PCSs) with combined functionalities of speech, data processing, facsimile and/or data communication; Personal Digital Assistants (PDAs), which may include RF receivers, pagers, internet networks/intranet accesses, web browsers, notepads, calendars and/or Global Positioning System (GPS) receivers; and/or conventional laptop and/or palmtop computers or other devices having and/or including a RF receiver. The "equipment" as used herein can be portable, transportable, mountable in transportations (air, sea and/or land transportations), or suitable and/or configured to run locally and/or distributed in other places in the earth and/or space for running. The "terminal" or "terminal equipment" as used herein may be a communication terminal, an internet terminal, a music/video player terminal. For example, it can be a PDA, a Mobile Internet Equipment (MID) and/or a mobile phone with a music/video playback function, or can be equipment such as a smart TV and a set-top box.

A Long Term Evolution (LTE) system supports two duplexing modes which are Frequency Division Duplexing (FDD) and Time Division Duplexing (TDD). FIG. 1 is a schematic diagram illustrating frame structure of a TDD system. The length of each radio frame is 10 ms, each radio frame is halved into two half-frames and the length of each half-frame is 5 ms. Each half-frame contains eight timeslots of each of which the length is 0.5 ms and three special fields, i.e., Downlink Pilot Timeslot (DwPTS), Guard Period (GP), and Uplink Pilot Timeslot (UpPTS). The total length of the three special fields is 1 ms. Transmission in the LTE system includes transmission from a base station to a User Equipment (UE) (referred to as downlink transmission) and a corresponding subframe is called a downlink subframe, and transmission from the UE to the base station (referred to as uplink transmission) and a corresponding subframe is called an uplink subframe.

In downlink communication of an LTE-A system, the reliability of downlink data reception is guaranteed by Hybrid Automatic Repeat reQuest (HARQ) technology. Downlink data is transmitted from the base station to the UE through a Physical Downlink Shared Channel (PDSCH). The UE transmits Hybrid Automatic Repeat request-Acknowledgement (HARQ-ACK) information to inform the base station whether the UE correctly receives the PDSCH or not. The UE transmits the HARQ-ACK information to the base station through a Physical Uplink Control Channel (PUCCH).

For each Transmission Block (TB) in a received PDSCH or a received PDCCH indicating Semi-Persistent Scheduling (SPS) release (hereinafter they are collectively referred to as downlink HARQ transmission), the UE needs to transmit an ACK (correctly receiving) bit or an NACK (incorrectly receiving or missing) bit to the base station through a corresponding uplink subframe, which are collectively referred to as an HARQ-ACK bit. If an eNB receives the NACK bit, the eNB retransmits a TB or a PDCCH indicating the SPS release corresponding to the NACK.

When the UE transmits the HARQ-ACK information through the PUCCH, the UE needs to know a PUCCH resource for transmitting the HARQ-ACK. The PUCCH for transmitting the HARQ-ACK may be obtained through an implicit manner or an explicit manner. The implicit manner is to obtain the PUCCH for transmitting the HARQ-ACK through index mapping of the lowest Control Channel Element (CCE) of a Physical Downlink Control Channel (PDCCH) scheduling the PDSCH. The explicit manner is that a group of PUCCH resources is configured through high-layer signaling, and then a PUCCH resource in the group of PUCCH resources configured by the high-layer signaling is indicated through a field (which is referred to as an HARQ-ACK Resource Indicator, ARI) in Downlink Control Information (DCI) in the PDCCH scheduling the PDSCH. In addition, power control is performed to the PUCCH transmitting the HARQ-ACK, and a power of transmitting the PUCCH is adjusted by a Transmission Power Control (TPC) field in the DCI in the PDCCH scheduling the PDSCH. In LTE-A, the ARI and the TPC share a public field. That is, in some DCIs, this public field is used as the TPC, while in some other DCIs, this public field is used as the ARI. Since HARQ-ACK of PDSCHs scheduled by multiple DCIs is transmitted in the same PUCCH, it is sufficient to indicate the resource through an ARI in one DCI during one time of PUCCH transmission, and it is sufficient to adjust the power through a TPC in one DCI during one time of PUCCH transmission. For example, a TPC in a DCI of which a Downlink Downlink Assignment Index (DL DAI) is equal to 1 is used as a TPC, while a TPC in a DCI of which the DL DAI is not equal to 1 is used as an ARI. An implicit PUCCH resource may be used only when HARQ-ACK of a PDSCH scheduled by the DCI of which the DL DAI is equal to 1 is to be transmitted.

As HARQ-ACK information of PDSCHs of multiple serving cells and HARQ-ACK information of PDSCHs of multiple downlink timeslots of each serving cell is transmitted through a PUCCH of one uplink timeslot, the number of bits of the HARQ-ACK information transmitted through the PUCCH of the uplink timeslot is to be determined so as to make the base station and the UE have the same understanding. One way is to determine the number of bits of the HARQ-ACK information according to high-layer signaling configuration. The other way is to dynamically determine the number of bits of the HARQ-ACK information. In this case, the DL DAI is introduced to assist the base station and the UE in the uniform understanding of the number of bits of the HARQ-ACK information. The DL DAI may include a counter DL DAI and a total DL DAI (or Sum DL DAI). The counter DL DAI refers to the number of PDCCHs scheduling the PDSCH and indicating the release which have been transmitted by the base station up to the current DCI and including the current DCI. The total DL DAI refers to the number of PDCCHs scheduling the PDSCH and indicating the release which have been transmitted by the base station up to a timeslot to which the current DCI belongs. Values of the total DL DAIs in different PDCCHs in the same timeslot are the same. As shown in FIG. 2, C-DAI refers to the counter DL DAI, and S-DAI refers to the total DL DAI.

In a New Radio (NR) communication system, since an HARQ-ACK timing relationship is dynamically determined, PUCCH resources used for transmitting the HARQ-ACK are explicitly indicated. In this case, there are no implicit PUCCH resources used for transmitting the HARQ-ACK, and each DCI must include the ARI field to indicate the PUCCH resources. At this time, there is still no ideal solution for how to transmit the TPC.

In the case of Carrier Aggregation (CA), since HARQ-ACK information for PDSCHs of multiple downlink cells and multiple downlink time slots of each cell is transmitted on PUCCHs of one uplink time slot, downlink cells which transmit HARQ-ACK on PUCCHs of uplink time slots for a same cell are called a Cell Group (CG). The number of bits of HARQ-ACK information transmitted on PUCCHs of one uplink time slot needs to be determined, so that the understanding of the base station is consistent with the understanding of the UE.

However, in the practical application, if, in one CG, some cells support one TB and some cells support two TBs, it is configured that two bits of HARQ-ACK information are generated for each PDSCH of all cells, so that it is simple to implement the protocol. But, since PDSCHs of cells supporting one TB need only one bit of HARQ-ACK information, the above configuration additionally increases the number of bits of HARQ-ACK. In addition, in a New Radio (NR) system, one TB contains multiple Code Block Groups (CBGs), and each CBG generates one bit or two bits of HARQ-ACK information. In this way, one TB of PDSCHs includes N*M bits of HARQ-ACK information, where N is the number of CBGs contained in one TB, and M is the number of bits of HARQ-ACK for each CBG. For example, cells without having CBGs support one TB and generate one bit or two bits of HARQ-ACK information, and each TB for cells supporting CBGs may contain eight CBGs and generate eight bits of HARQ-ACK information. In this case, the number of bits of HARQ-ACK generated by all cells without having CBGS is set to eight. However, more bits are additionally increased in HARQ-ACK information, and many unnecessary resources are occupied for transmitting PUCCHs.

According to an HARQ-ACK feedback mechanism defined by a current LTE standard, a UE uses a shared public field TPC as a TPC and an ARI. That is, when a counter DL DAI is equal to 1 for the first time, the public field TPC is used as a TPC to indicate a power adjustment value. When the counter DL DAI is equal to another value, the public field TPC is used as an ARI to indicate a PUCCH resource for transmitting the HARQ-ACK. When the UE only receives a DCI of which the counter DL DAI is equal to 1, the UE transmits the HARQ-ACK using an implicit PUCCH resource. However, there are no implicit PUCCH resources available in the NR. Therefore, the UE cannot use the public field as the TPC and ARI. The UE needs a dedicated field used as the ARI to indicate the PUCCH resource for transmitting the HARQ-ACK. As such, how to transmit the TPC is to be solved. In order to solve this problem, the present disclosure proposes a method for transmitting HARQ-ACK information. As shown in FIG. 3, a basic method for transmitting the HARQ-ACK information proposed in the present disclosure includes operations as follows.

At Step 310, a UE determines the number of bits of HARQ-ACK information.

Preferably, the number of bits of the HARQ-ACK information may be determined through two manners as follows (the UE may determine to adopt which one of the two ways according to received high-layer signaling). One manner is that the UE semi-statically determines a set of all of downlink timeslots that need to or may need to transmit the HARQ-ACK information on an uplink subframe n through receiving high-layer signaling configuration, then determines the number of bits of the HARQ-ACK information according to a transmission mode configured for each serving cell. In this case, the counter DL DAI may exist in the DL DCI in the PDCCH scheduling the PDSCH or indicating the SPS release and the bits of the HARQ-ACK are arranged in an order of DL DAIs. Alternatively, the counter DL DAI may not exist in the DL DCI and the bits of the HARQ-ACK are arranged in an order of timeslots. Since the number of bits of the HARQ-ACK is configured by the high-layer signaling, the total DL DAI does not exist in the DL DCI. This manner is described in detail in the subsequent first embodiment.

In another manner, the UE dynamically determines the total number of bits of the HARQ-ACK transmitted by the uplink subframe n. For example, in order to prevent the base station and the UE from having different understanding on the total number of bits of the HARQ-ACK transmitted by the uplink subframe n, the number of bits of the HARQ-ACK transmitted by the uplink subframe n may be determined by the counter DL DAI and the total DL DAI in the DL DCI in the PDCCH scheduling the PDSCH or indicating the SPS release. This manner is described in detail in the subsequent second embodiment.

Of course, methods of determining the number of bits of the HARQ-ACK information are not limited to the above-mentioned two manners.

At Step 320, the UE determines a PUCCH resource transmitting the HARQ-ACK information.

Preferably, the PUCCH resource transmitting the HARQ-ACK information may be determined by high-layer signaling configuration (or a system information indication) and a physical layer signaling indication.

More specifically, the UE may determine a set of one or more PUCCH resources with different formats or a same format by receiving the high-layer signaling (or the system information indication), and then determine one PUCCH resource from the PUCCH resource set as the resource for transmitting the HARQ-ACK by receiving the physical layer signaling indication. For example, the UE determines a PUCCH resource set S1 by receiving the high-layer signaling configuration. The set S1 includes four PUCCH resources as {s1, s2, s3, s4}. A specific parameter of each PUCCH resource in the set is configured by the high-layer signaling. The specific parameters of the PUCCH resources may be the same or different. Formats of the PUCCH resources in the same set may be the same or different. When the UE configures more than one PUCCH resource set by receiving the high-layer signaling, formats of PUCCH resources in different sets are different. The physical layer signaling indicating the PUCCH resource is referred to as an ARI. Preferably, the ARI is a separate field in the DCI and is not shared with other fields.

At Step 330, the UE determines a PUCCH power adjustment value for transmitting the HARQ-ACK.

The PUCCH power adjustment value transmitting the HARQ-ACK is determined by a shared field of the TPC and the total DL DAI of the DL DCI in the PDCCH scheduling the PDSCH or indicating the SPS release. In the present disclosure, a TPC command does not share the same field with the ARI indicating a PUCCH resource, instead, a new field—the shared field of the TPC and the total DL DAI is proposed. If the total DL DAI exists in the DCI, the shared field of the TPC and the total DL DAI may be used to transmit the TPC command or a value of the total DL DAI. That is, the TPC command and the total DL DAI share the same field. If the total DL DAI does not exist in the DCI, the shared field of the TPC and the total DL DAI only transmits the TPC command. In this case, the TPC command is transmitted on a field that can be separately used (i.e., the shared field of the TPC and the total DL DAI).

At Step 340, the UE transmits a bit sequence of the HARQ-ACK information according to the determined number of bits of the HARQ-ACK, the PUCCH resource transmitting the HARQ-ACK information, and the PUCCH power adjustment value transmitting the HARQ-ACK information.

It should be noted that, the present disclosure does not constrain an execution order of Step 310, Step 320, and Step 330 performed by the UE. A solution obtained through adjusting the execution order of one or more than one of the above three steps is still within the protection scope of the present disclosure.

In order to facilitate understanding of the present disclosure, hereinafter the above-mentioned technical solution of the present disclosure is further described in terms of an interaction mode between devices combining with specific situations.

Embodiment 1

In this embodiment, the number of bits of HARQ-ACK of a UE is semi-statically determined. Specific operations of transmitting the HARQ-ACK are described as follows.

At Step 310, the UE determines the number of bits of the HARQ-ACK.

If there is a counter DL DAI field in a PDCCH, the number of bits of the HARQ-ACK of the UE is semi-statically determined according to high-layer signaling configuration. For example, the UE is configured with four serving cells and a bundling window of each serving cell is 4. That is, HARQ-ACK information of four downlink timeslots of each serving cell is transmitted in one uplink timeslot, i.e., a set of all of downlink timeslots that need or may need to transmit the HARQ-ACK in the uplink subframe n includes sixteen downlink timeslots of four serving cells; the number of bits of the counter DL DAI field in the PDCCH is 2, the bits of the HARQ-ACK of the UE are arranged in an ascending order of the DL DAIs, and the number of bits of the HARQ-ACK in each downlink timeslot of each serving cell is 1. As such, the total number of bits of the HARQ-ACK transmitted on the PUCCH in one uplink timeslot is 4*4=16 bits, as shown in FIG. 4. When the UE is in the four serving cells, the UE learns that a base station sends a PDSCH or a PDCCH indicating the SPS release in one downlink timeslot of one serving cell (for example, the UE only receives a PDCCH of which the counter DL DAI is equal to 1). That is, when HARQ-ACK information of one downlink timeslot of one serving cell is to be transmitted, the number of bits of the HARQ-ACK information is q (a value of q may be 1 or 2, which is determined according to a transmission mode of the serving cell; for example, when the transmission mode of the serving cell supports transmission of one transmission block, q is equal to 1; when the transmission mode of the serving cell supports transmission of two transmission blocks, q is equal to 2), as shown in FIG. 5. When the UE is in the four serving cells, the UE learns that the base station sends the PDSCH or the PDCCH indicating the SPS release in at least two downlink timeslots of one or multiple serving cells, i.e., HARQ-ACK information of at least two downlink timeslots is to be transmitted, the number of bits of the HARQ-ACK information is the total number of bits of the HARQ-ACK corresponding to all of downlink timeslots in the aforementioned set, which is equal to 16, as shown in FIG. 6.

If the counter DL DAI field does not exist in the PDCCH, the number of bits of the HARQ-ACK information is the total number of bits of the HARQ-ACK corresponding to all of downlink timeslots in the aforementioned set no matter whether the UE receives the PDCCH in one timeslot of one serving cell, which is equal to 16. The bits of the HARQ-ACK information are arranged in an order of timeslots and serving cells. Because if the base station sends two PDCCHs, the UE may miss the first PDCCH and the UE does not know the missing of the first PDCCH, and then misunderstanding may occur between the base station and the UE.

At Step 320, the UE determines a PUCCH resource for transmitting the HARQ-ACK.

If the UE detects the PDCCH in a downlink timeslot, the UE acquires a status of an ARI field in the PDCCH and may acquire the DL DAI. In this embodiment, the ARI field includes 2 bits. According to the embodiment of the present disclosure, a mapping relationship between the status of the ARI field and the PUCCH resource is defined in Table 1. According to the mapping relationship between the ARI field and the PUCCH resource shown in Table 1, a corresponding PUCCH resource is found to transmit the HARQ-ACK.

The UE receives a set including four PUCCH resources configured by high-layer signaling, which are PUCCH resource {s1, s2, s3, s4}. PUCCH formats of different PUCCH resources in this resource set may be different. For example, PUCCH resource $s_1$ is a short PUCCH resource and transmits HARQ-ACK information with at most 2 bits. PUCCH resource $s_2$, $s_3$, and $s_4$ are long PUCCH resources, and the number of bits of HARQ-ACK information respectively transmitted by PUCCH resource $s_2$, $s_3$, and $s_4$ is greater than 2. The PUCCH formats of different PUCCH resources in this resource set may be the same, e.g., PUCCH resource $s_1$, $s_2$, $s_3$, and $s_4$ are long PUCCH resources, and the number of bits of HARQ-ACK information respectively transmitted by PUCCH resource $s_1$, $s_2$, $s_3$, and $s_4$ is greater than 2.

TABLE 1 mapping relationship between ARI field and PUCCH resource

| ARI MSB, LSB | PUCCH resources |
| --- | --- |
| 0, 0 | PUCCH resource $s_1$ configured by the high-layer signaling |
| 0, 1 | PUCCH resource $s_2$ configured by the high-layer signaling |
| 1, 0 | PUCCH resource $s_3$ configured by the high-layer signaling |
| 1, 1 | PUCCH resource $s_4$ configured by the high-layer signaling |

The UE receives at least two PUCCH resource sets configured by the high-layer signaling, each set includes four PUCCH resources. For example, PUCCH resources included in the set 1 are {s11, s12, s13, s14}, and PUCCH formats of different PUCCH resources in this resource set are the same. PUCCH resources included in the set 2 are {s21, s22, s23, s24}, and PUCCH formats of different PUCCH resources in this resource set are the same. The PUCCH formats of the PUCCH resources in the set 1 and the PUCCH formats of the PUCCH resources in the set 2 are different. For example, the PUCCH resources in the PUCCH resource set 1 are configured with a short PUCCH format and transmit HARQ-ACK information with at most two bits, the PUCCH resources in the PUCCH resource set 2 are configured with a long PUCCH format and the number of bits of HARQ-ACK information transmitted is greater than 2. The UE determines which PUCCH resource set is to be used according to the received PDCCH. That is, the ARI in the PDCCH indicates PUCCH resources in different sets under different situations. For example, when the UE receives a PDCCH in one timeslot and the counter DL DAI in the PDCCH is equal to 1, it is determined that the ARI in the PDCCH indicates the PUCCH resources in the set 1. In other situations, the ARI in the PDCCH indicates the PUCCH resources in the set 2. If the DL DAI field does not exist in the PDCCH, the ARI only indicates the PUCCH resources in one set, because the UE may not determine whether there is a missed PDCCH at this time.

At Step 330, the UE determines a PUCCH power adjustment value for transmitting the HARQ-ACK information on timeslot n.

In this embodiment, a shared field of the TPC and the total DL DAI is introduced in the PDCCH. Since the number of bits of the HARQ-ACK is semi-statically determined at this time, the UE does not need to use the total DL DAI to determine the number of bits of the HARQ-ACK. This shared field is used to just transmit a TPC command (this field may also be referred to as a TPC field).

When the counter DL DAI field exists in the PDCCH, the UE determines information carried by a part of specified shared fields of the TPC and the total DL DAI in all of the received PDCCHs as the TPC command. In this case, the specified shared field of the TPC and the total DL DAI may be a situation as follows: when a serving cell where a PDCCH of which the counter DL DAI is equal to 1 received by the UE for the first time is located is a primary cell (Pcell), and a primary secondary cell (PScell), the shared field of the TPC and the total DL DAI thereof is the specified shared field of the TPC and the total DL DAI. Information carried in the corresponding field is used as the TPC command to adjust the PUCCH power adjustment value for transmitting the HARQ-ACK. The shared field of the TPC and the total DL DAI in other cases is used as a reserved field. Or, the specified shared field of the TPC and the total DL DAI may be a situation as follows: when a serving cell where a PDCCH of which the counter DL DAI is equal to 1 received by the UE for the first time is located is a primary cell (Pcell), a primary secondary cell (PScell), and a secondary cell (Scell), the shared field of the TPC and the total DL DAI thereof is the specified shared field of the TPC and the total DL DAI. Information carried in the corresponding field is used as the TPC command to adjust the PUCCH power adjustment value for transmitting the HARQ-ACK. The shared field of the TPC and the total DL DAI in other cases is used as a reserved field. With this method, the opportunity for transmitting the TPC command can be increased, because if the UE does not schedule data on the primary cell at this time, the transmission power of the PUCCH may still be adjusted through the TPC command in the PDCCH of data scheduled by the secondary cell. Alternatively, the specified shared field of the TPC and the total DL DAI may be a situation as follows: shared fields of the TPC and the total DL DAI in all of PDCCHs received by the UE are the specified shared fields of the TPC and the total DL DAI. Information carried in the corresponding fields is used as the TPC command to adjust the PUCCH power adjustment value for transmitting the HARQ-ACK. With this method, the transmission power of the PUCCH can be adjusted more quickly because power adjustment values of multiple TPC commands can be superimposed.

When the counter DL DAI field does not exist in the PDCCH, shared fields of the TPC and the total DL DAI in all of PDCCHs of any serving cell received by the UE are determined as the TPC command to adjust the PUCCH power adjustment value for transmitting the HARQ-ACK. Alternatively, information carried by a part of specified shared fields of the TPC and the total DL DAI in all of the PDCCHs received by the UE is determined as the TPC command, and a remaining shared field of the TPC and the total DL DAI is used as a reserved field. In this case, the specified shared field of the TPC and the total DL DAI may be a situation as follows: when a serving cell where a PDCCH received by the UE is located is a primary cell (Pcell), and a primary secondary cell (PScell), the shared field of the TPC and the total DL DAI thereof is the specified shared field of the TPC and the total DL DAI. Information carried in the corresponding field is used as the TPC command to adjust the PUCCH power adjustment value for transmitting the HARQ-ACK, a remaining shared field of the TPC and the total DL DAI is used as a reserved field. With this method, the transmission power of the PUCCH can be adjusted more quickly because power adjustment values of multiple TPC commands can be superimposed.

In the above processing, the newly-introduced shared field of the TPC and the total DL DAI is just used for transmitting the TPC command, i.e., as a separate TPC field.

Embodiment 2

In this embodiment, the number of bits of HARQ-ACK of a UE is dynamically determined. Specific operations of transmitting the HARQ-ACK are described as follows.

At Step 310, the UE determines the number of bits of the HARQ-ACK.

The number of bits of the HARQ-ACK of the UE is dynamically determined according to a counter DL DAI and a total DL DAI in a PDCCH received by the UE.

For example, the UE is configured with four serving cells and HARQ-ACK information of the four serving cells is transmitted in one uplink timeslot. The number of bits of the counter DL DAI field is 2 and the number of bits of the total DL DAI field is 2. Assuming that transmission modes of the four serving cells support transmission of one transmission block, i.e., the number of bits of HARQ-ACK of one downlink timeslot of one serving cell is 1. As such, when the UE is in the four serving cells, the UE learns that a base station sends a PDSCH or a PDCCH indicating SPS release in two downlink timeslots of at least one serving cell or multiple serving cells (for example, the UE only receives a PDCCH of which a counter DL DAI is equal to 1). That is, when HARQ-ACK information of two downlink timeslots of at least one serving cell or multiple serving cells is to be transmitted, the number of bits of the HARQ-ACK transmitted on a PUCCH of one uplink timeslot may be obtained according to the counter DL DAI and the total DL DAI received by the UE. FIG. 7 illustrates a counter DL DAI and a total DL DAI in a PDCCH received by the UE. The UE receives five PDCCHs, in which values of the counter DL DAIs are 1, 2, 3, 4, and 1, respectively; and a value of the total DL DAIs is determined as follows. A counter DL DAI of a PDCCH received in the first timeslot is equal to 1 and a total DL DAI of the PDCCH is used as a TPC command to adjust a PUCCH transmission power. A total DL DAI of two PDCCHs received in the second timeslot is equal to 3. A total DL DAI of two PDCCHs received in the fifth timeslot is equal to 1. The total number of bits of the HARQ-ACK can be calculated as 5. That is, the total DL DAI in the PDCCH of which the counter DL DAI is equal to 1 is used as the TPC command, and the total DL DAIs in other PDCCHs are used as the total DL DAI.

For example, when the UE is in the four serving cells, the UE learns that the base station sends a PDSCH or a PDCCH indicating SPS release in one downlink timeslot of one serving cell (for example, the UE only receives a PDCCH of which a counter DL DAI is equal to 1). That is, when HARQ-ACK information of one downlink timeslot of one serving cell is to be transmitted, the number of bits of the HARQ-ACK information is q (q may be 1 or 2, which is determined according to a transmission mode of the serving cell; for example, when the transmission mode of the serving cell supports transmission of one transport block, q is equal to 1; when the transmission mode of the serving cell supports transmission of two transport blocks, q is equal to 2), as shown in FIG. 5. In this case, the shared field of the TPC and the total DL DAI is used as the TPC command to adjust the PUCCH transmission power because it is not necessary to calculate the total number of bits of the HARQ-ACK based on the total DL DAI.

At Step 320, the UE determines a PUCCH resource for transmitting the HARQ-ACK.

If the UE detects the PDCCH in a downlink timeslot, the UE acquires a status of an ARI field in the PDCCH. In this embodiment, the ARI field includes 2 bits. According to the embodiment of the present disclosure, a mapping relationship between the status of the ARI field and the PUCCH resource is defined in Table 2. According to the mapping relationship between the ARI field and the PUCCH resource shown in Table 2, a corresponding PUCCH resource is found to transmit the HARQ-ACK.

The UE receives a set including four PUCCH resources configured by high-layer signaling, which are PUCCH resource {s1, s2, s3, s4}. PUCCH formats of different PUCCH resources in this resource set may be different. For example, PUCCH resource $s_1$ is a short PUCCH resource and transmits HARQ-ACK information with at most 2 bits. PUCCH resource $s_2$, $s_3$, and $s_4$ are long PUCCH resources, and the number of bits of HARQ-ACK information respectively transmitted by PUCCH resource $s_2$, $s_3$, and $s_4$ is greater than 2. The PUCCH formats of different PUCCH resources in this resource set may be the same, e.g., PUCCH resource $s_1$, $s_2$, $s_3$, and $s_4$ are long PUCCH resources, and the number of bits of HARQ-ACK information respectively transmitted by PUCCH resource $s_1$, $s_2$, $s_3$, and $s_4$ is greater than 2.

TABLE 2 mapping relationship between ARI field and PUCCH resource

| ARI MSB, LSB | PUCCH resources |
| --- | --- |
| 0, 0 | PUCCH resource $s_1$ configured by the high-layer signaling |
| 0, 1 | PUCCH resource $s_2$ configured by the high-layer signaling |
| 1, 0 | PUCCH resource $s_3$ configured by the high-layer signaling |
| 1, 1 | PUCCH resource $s_4$ configured by the high-layer signaling |

The UE receives at least two PUCCH resource sets configured by the high-layer signaling, each set includes four PUCCH resources. For example, PUCCH resources included in the set 1 are {$s_{11}$, $s_{12}$, $s_{13}$, $s_{14}$}, and PUCCH formats of different PUCCH resources in this resource set are the same. PUCCH resources included in the set 2 are {$s_{21}$, $s_{22}$, $s_{23}$, $s_{24}$}, and PUCCH formats of different PUCCH resources in this resource set are the same. The PUCCH formats of the PUCCH resources in the set 1 and the PUCCH formats of the PUCCH resources in the set 2 are different. For example, the PUCCH resources in the PUCCH resource set 1 are configured with a short PUCCH format and HARQ-ACK information with at most 2 bits may be transmitted, the PUCCH resources in the PUCCH resource set 2 are configured with a long PUCCH format and the number of bits of HARQ-ACK information transmitted is greater than 2. The UE determines which PUCCH resource set is to be used according to the received PDCCH. That is, the ARI in the PDCCH indicates PUCCH resources in different sets under different situations. For example, when the UE receives a PDCCH in one timeslot and the counter DL DAI in the PDCCH is equal to 1, it is determined that the ARI in the PDCCH indicates the PUCCH resources in the set 1. In other situations, the ARI in the PDCCH indicates the PUCCH resources in the set 2. At Step 330, the UE determines a PUCCH power adjustment value for transmitting the HARQ-ACK information on timeslot n.

In this embodiment, a shared field of the TPC and the total DL DAI is introduced in the PDCCH. This shared field may only transmit a TPC command, or may transmit the TPC command or a total DL DAI.

Specifically, the UE may determine information carried in a part of specified shared fields of the TPC and the total DL DAI in all of received PDCCHs as the TPC command, and information carried in a remaining shared field of the TPC and the total DL DAI as a value of the total DL DAI.

More specifically, the specified shared field of the TPC and the total DL DAI may be a situation as follows: when a serving cell where a PDCCH of which the counter DL DAI is equal to 1 received by the UE for the first time is located is a primary cell (Pcell), and a primary secondary cell (PScell), the shared field of the TPC and the total DL DAI thereof is the specified shared field of the TPC and the total DL DAI. Information carried in the corresponding field is used as the TPC command to adjust the PUCCH power adjustment value for transmitting the HARQ-ACK. The shared field of the TPC and the total DL DAI in other cases is used as the total DL DAI.

Alternatively, the specified shared field of the TPC and the total DL DAI may be a situation as follows: when a serving cell where a PDCCH of which the counter DL DAI is equal to 1 received by the UE for the first time is located is a primary cell (Pcell), a primary secondary cell (PScell), and a secondary cell (Scell), the shared field of the TPC and the total DL DAI thereof is the specified shared field of the TPC and the total DL DAI. Information carried in the corresponding field is used as the TPC command to adjust the PUCCH power adjustment value for transmitting the HARQ-ACK. The shared field of the TPC and the total DL DAI in other cases is used as the total DL DAI. With this method, the opportunity for transmitting the TPC command can be increased, because if the UE does not schedule data on the primary cell at this time, the transmission power of the PUCCH may still be adjusted through the TPC command in the PDCCH of data scheduled by the secondary cell.

The above-mentioned situation in which the counter DL DAI is equal to 1 for the first time is due to the limited number of bits of the counter DL DAI. The number of PDCCHs actually received by the UE may be greater than the number indicated by the counter DL DAI. For example, when the counter DL DAI is 2 bits, the maximum number that can be expressed is 4. In this case, when the UE receives five PDCCHs, the counter DL DAI of the first PDCCH is equal to 1, the counter DL DAI of the second PDCCH is equal to 2, the counter DL DAI of the third PDCCH is equal to 3, the counter DL DAI of the fourth PDCCH is equal to 4, and the counter DL DAI of the fifth PDCCH is equal to 1. As described above, the total DL DAI in the PDCCH of which the counter DL DAI is equal to 1 for the first time is determined as the TPC, and the total DL DAI in the PDCCH of which the counter DL DAI is equal to 1 for the second time is determined as the total DL DAI, as shown in FIG. 8.

The foregoing description is a specific implementation of the method for transmitting the HARQ-ACK proposed in the present disclosure. Embodiments of the present disclosure further provide a user equipment for transmitting the HARQ-ACK. As shown in FIG. 9, the user equipment includes a bit number determining unit, a resource determining unit, a power adjustment value determining unit, and a transmitting unit.

The bit number determining unit is configured to determine the number of bits of HARQ-ACK information transmitted on an uplink subframe n.

The resource determining unit is configured to determine a PUCCH resource for transmitting the HARQ-ACK information.

The power adjustment value determining unit is configured to determine a PUCCH power adjustment value for transmitting the HARQ-ACK information according to a shared field of a TPC and a total DL DAI in a DL DCI of a PDCCH scheduling a PDSCH or indicating semi-static SPS release.

The transmitting unit is configured to transmit the HARQ-ACK on the uplink subframe n according to the determined number of bits, the PUCCH resource, and the PUCCH power adjustment value.

In this case, the shared field of the TPC and the total DL DAI is just used to transmit a value of the TPC, or the shared field of the TPC and the total DL DAI is used to transmit the value of the TPC or a value of the total DL DAI. And, n is a subframe index.

The embodiments of the application provide a method for determining the number of bits of HARQ-ACK information, as shown in FIG. 10, the method includes the following steps.

Step 1010: Subgroups of cells in a cell group and a way of determining the number of bits of HARQ-ACK information corresponding to each subgroup are determined based on a received signaling.

A UE may determine which one of the following three methods is used as the way of determining the number of bits of HARQ-ACK information in one CG by receiving a signaling (for example, a higher-layer signaling) sent by a base station, the signaling containing configuration information.

Method 1: The number of bits of HARQ-ACK information for cells in one CG is semi-statically determined.

Method 2: The number of bits of HARQ-ACK information for cells in one CG is dynamically determined.

In this case, DL Downlink Assignment Indexes (DL DAIs) need to be introduced for the purpose of assistance, so that the understanding of the base station and the understanding of the UE in the number of bits of HARQ-ACK information are consistent. DL DAIs may comprise counter DL DAIs and sum DL DAIs (which are also called total DL DAIs). The counter DL DAIs refer to the number of PDCCHs already transmitted by the base station to schedule PDSCHs and indicate the release up to the current DAI (including the current DAI); and the sum DL DAIs refer to the number of PDCCHs already transmitted by the base station to schedule PDSCHs and indicate the release up to a time slot where the current DAI is located, and values for the sum DL DAIs in different PDCCHs in a same time slot are the same. As shown in FIG. 2, in the drawing, C-DAIs refer to counter DL DAIs and S-DAIs refer to sum DL DAIs.

In the embodiments of the present disclosure, when the number of bits of HARQ-ACK information is dynamically determined, the number of bits of HARQ-ACK information corresponding to downlink time slots for cells configured to be bound in the subgroups is bound.

Method 3: The UE divides cells in the CG into two parts by receiving a signaling sent by the base station. The number of bits of HARQ-ACK information for cells in the first part is semi-statically determined, the number of bits of HARQ-ACK information for cells in the second part is dynamically determined, and the total number of bits of HARQ-ACK information for cells in the CG is the sum of the number of bits of the HARQ-ACK information for cells in the first part and the number of bits of the HARQ-ACK information for cells in the second part. In this way, the number of bits of the HARQ-ACK information in the CG is determined.

Step 1020: The number of bits of HARQ-ACK information for each subgroup of cells in the cell group is determined based on the way of determining the number of bits of HARQ-ACK information corresponding to each subgroup.

A simple example of this step has been described in the method 3. Preferably, in the embodiments of the present disclosure, cells in a same CG are divided into two subgroups based on the received signaling, wherein the first subgroup corresponds to the way of semi-statically determining the number of bits of HARQ-ACK information, and the second subgroup corresponds to the way of dynamically determining the number of bits of HARQ-ACK information.

The number of bits of HARQ-ACK information for each subgroup of cells in the CG is determined based on the way of determining the number of bits of HARQ-ACK information corresponding to each subgroup;
  wherein, the way of determining the number of bits of HARQ-ACK information includes at least one of the following:
  semi-statically determining the number of bits of the HARQ-ACK information; and
  dynamically determining the number of bits of the HARQ-ACK information.

Wherein, the way of semi-statically determining the number of bits of HARQ-ACK information for the first subgroup specifically includes:
  acquiring the number of cells in the subgroup, the number of downlink time slots for each cell transmitting HARQ-ACK information in a same uplink time slot and the number of bits of HARQ-ACK information corresponding to each downlink time slot; and
  calculating, based on the number of cells, the number of downlink time slots for each cell and the number of bits of HARQ-ACK information corresponding to each downlink time slot, the number of bits of the HARQ-ACK information for the subgroup.

The way of dynamically determining the number of bits of HARQ-ACK information for the second subgroup by the UE specifically includes:
  determining, based on DL Downlink Assignment Indexes (DAIs) in received Physical Downlink Control Channels (PDCCHs), the total number of received PDCCHs; and
  calculating, based on the number of PDCCHs and the number of bits of HARQ-ACK information corresponding to each configured PDCCH, the number of bits of the HARQ-ACK information for the subgroup.

The embodiments of the present disclosure further provide a method for determining the number of bits of HARQ-ACK information. The number of bits of HARQ-ACK information corresponding to downlink time slots for cells configured to be bound in any one of subgroups is bound based on the received signaling;

wherein, for the semi-static subgrouping way (i.e., the first subgroup), the number of bits of HARQ-ACK information corresponding to downlink time slots for all cells which may be bound is bound; and the number of bits of HARQ-ACK information for each cell in the subgroup may be the same or different, because the same number of bits of HARQ-ACK information is not required for different cells in the subgroup; for the dynamic subgrouping way (i.e., the second subgroup), the number of bits of HARQ-ACK information corresponding to downlink time slots for cells configured to be bound in any one of subgroups is bound; and the number of bits of HARQ-ACK information for each cell in the subgroup is approximate, because the similar number of bits of HARQ-ACK information is required for different cells in the subgroup.

Step 1030: The number of bits of HARQ-ACK information for the cell group is obtained based on the number of bits of the HARQ-ACK information for the each subgroup of cells for transmitting the HARQ-ACK information.

Briefly, a method for determining the number of bits of HARQ-ACK information is semi-statically determined by the UE, and another method for determining the number of bits of HARQ-ACK information is dynamically determined by the UE. Cells in the CG may be divided into two parts, for example, the number of bits of HARQ-ACK information for cells in one part is semi-statically determined, the number of bits of HARQ-ACK information for cells in the other part is dynamically determined, and the total number of bits of HARQ-ACK information for cells in the CG is the sum of the number of bits of the HARQ-ACK information for cells in the two parts.

In the method for determining the number of bits of HARQ-ACK information based on the present disclosure, subgroups of cells in a cell group and a way of determining the number of bits of HARQ-ACK information corresponding to each subgroup are determined based on a received signaling, for example, a method for semi-statically determining the number of bits of the HARQ-ACK information can be used for some of cells, and a method for dynamically determining the number of bits of the HARQ-ACK information is used for other cells, so that it is unnecessary to configure cells to be the same and have a large number of bits for transmitting based on the existing technologies; the number of bits of HARQ-ACK information for each subgroup of cells in the cell group is determined based on the way of determining the number of bits of HARQ-ACK information corresponding to each subgroup; and the number of bits of HARQ-ACK information for the cell group is obtained based on the number of bits of the HARQ-ACK information for the each subgroup of cells for transmitting the HARQ-ACK information. The extra number of bits of HARQ-ACK information is reduced, and resources for PUCCH for transmitting HARQ-ACK information are saved.

The application further provides a method for configuring the number of bits of HARQ-ACK information, as shown in FIG. 11, comprising the following steps.

Step 1110: Subgroups of cells in a cell group and a way of determining the number of bits of HARQ-ACK information corresponding to each subgroup are configured, so that a UE determines the number of bits of HARQ-ACK information for each subgroup of cells in the cell group.

Specifically, cells in the cell group are divided into two subgroups and the way of determining the number of bits of HARQ-ACK information for each subgroup is configured, wherein the determination way includes at least one of the following: semi-static determination and dynamic determination. For example, it is configured that the number of bits of HARQ-ACK information for the first subgroup is semi-statically determined; and the number of bits of HARQ-ACK information for the second subgroup is dynamically determined.

Step 1120: A signaling carrying the subgroups is sent.

Step 1130: HARQ-ACK information is received, which is transmitted by the UE based on the number of bits of HARQ-ACK information for the cell group.

The embodiments of the present disclosure further provide a method for configuring the number of bits of HARQ-ACK information. Cells in which the number of bits of HARQ-ACK information needs to be bound by the UE are determined based on the number of bits of HARQ-ACK information corresponding to downlink time slots for each cell; and cells to be bound are assigned to corresponding subgroups. Therefore, after the UE binds the number of bits of HARQ-ACK information corresponding to downlink time slots for cells, for the semi-static subgrouping way, the number of bits of HARQ-ACK information for each cell in the subgroup may be the same or different, and for the dynamic subgrouping way, the number of bits of HARQ-ACK information for each cell in the subgroup is approximate. For example, cells to be bound in the first subgroup are configured, so that the number of bits of HARQ-ACK information for each cell in the first subgroup is the same or different after the UE binds the number of bits of HARQ-ACK information corresponding to downlink time slots for cells to be bound; and cells to be bound in the second subgroup are configured, so that the number of bits of HARQ-ACK information for each cell in the second subgroup is approximate after the UE binds the number of bits of HARQ-ACK information corresponding to downlink time slots for cells to be bound.

For example, the method for configuring the number of bits of HARQ-ACK information and the method for determining the number of bits of HARQ-ACK information are interactive, and will not be described here.

To easily understand the present application, the technical solutions of the present application will be further described below with reference to specific applications, by taking inter-equipment interaction as an example.

Embodiment 3

In this embodiment, the determination of the number of bits of HARQ-ACK information in each CG by the Method 3 of determining the number of bits of HARQ-ACK information in one CG will be described. That is, the UE receives a signaling from the base station, which configures the determination of the number of bits of HARQ-ACK information in each CG by the Method 3. The specific implementation of HARQ-ACK transmission is as follows:

the UE determines the number of bits of HARQ-ACK information in each CG by a way of subgrouping cells in the CG; and the higher-layer signaling received by the UE from the base station configures at least two downlink cells (for example, N cells, where N is a positive integer and is greater than or equal to 2), at least one of which is configured to provide PUCCHs of uplink time slots for transmitting the HARQ-ACK. N downlink cells configured in this way belong to one CG. That is, HARQ-ACK information for the N downlink cells is transmitted on PUCCHs of uplink time slots for one cell. The N downlink cells are divided into two subgroups by configuring by the higher-layer signaling, i.e., subgroup 1 and subgroup 2, respectively (there is no superposition between cells in the subgroup 1 and cells in the subgroup 2, that is, any one of the N cells belongs to either the subgroup 1 or the subgroup 2 and is impossible to belong to both the subgroup 1 and the subgroup 2). There are N1 cells in the subgroup 1 and N2 cells in the subgroup 2 (N1+N2=N, N1>=0 and N1<=N, and N2>=0 and N2<=N). HARQ-ACK information for cells in the subgroup 1 is semi-statically determined, and HARQ-ACK information for cells in the subgroup 2 is dynamically determined.

For cells in the subgroup 1, the number of bits of HARQ-ACK information in the subgroup 1 is determined by the following method.

The number of bits of HARQ-ACK information for the UE is semi-statically determined. For example, 4 downlink cells are configured in the subgroup 1, and there are 4 bundling windows for each downlink cell. That is, HARQ-ACK information corresponding to 4 downlink time slots for each cell is transmitted in one uplink time slot, and the number of bits of HARQ-ACK in each downlink time slot for each cell is 1. In this case, the total number of bits of HARQ-ACK information for cells in the subgroup 1 is 4*4=16 bits, as shown in FIG. 12.

For cells in the subgroup 2, the number of bits of HARQ-ACK information in the subgroup 2 is determined by the following method.

The number of bits of HARQ-ACK information for the UE is dynamically determined based on counter DL DAIs and sum DL DAIs in PDCCHs received by the UE, and the counter DL DAIs and the sum DL DAIs are specific to only PDCCHs of cells in the subgroup 2.

For example, 4 cells are configured in the subgroup 2, and HARQ-ACK information for the 4 cells is transmitted in one uplink time slot. The number of bits of the counter DL DAI field is 2, and the number of bits of the sum DL DAI field is 2. It is assumed that all the transmission modes of the 4 cells support transmission of one TB and one TB contains 8 CBGs each generating one bit of HARQ-ACK information, that is, the number of bits of HARQ-ACK information corresponding to one downlink time slot for one cell is 8, and the total number of bits of HARQ-ACK transmitted on PUCCHs of one uplink time slot may be obtained based on counter DL DAIs and sum DL DAIs received by the UE. FIG. 13 shows the counter DL DAIs and sum DL DAIs in PDCCHs received by the UE. The UE receives total 5 PDCCHs, wherein values for counter DL DAIs are 1, 2, 3, 4, 1, respectively, and values for sum DL DAIs are specifically as follows: the sum DL DAI of one PDCCH received in the first time slot is 1, the sum DL DAI of two PDCCHs received in the second time slot is 3, and the sum DL DAI of two PDCCHs received in the fourth time slot is 1. It may be calculated that total 5 PDCCHs are received, PDSCHs scheduled by each PDCCH generate 8 bits of HARQ-ACK information, and the total number of bits of HARQ-ACK information is 5*8=40.

In this way, the total number of bits of HARQ-ACK information for cells in the subgroup 1 is 16 bits, the total number of bits of HARQ-ACK information for cells in the subgroup 2 is 40 bits, so the total number of bits of HARQ-ACK information in the CG is 16+40=56 bits.

Embodiment 4

In this embodiment, a method for bundling HARQ-ACK information (i.e., compressing HARQ-ACK information, for example, spacial bundling of HARQ-ACK information, wherein the spacial bundling of HARQ-ACK information is as follows: for cells supporting the transmission of two TBs, the number of bits of HARQ-ACK information for each time slot without spacial bundling is 2, and for cells supporting the transmission of two TBs, the number of bits of HARQ-ACK information for each time slot with spacial bundling is 1) to determine the number of bits of HARQ-ACK information in one CG will be described. In this embodiment, it may be configured that bundling (for example, spacial bundling) is performed on all cells configured for the UE. That is, if bundling is performed, all cells configured for the UE, which support the transmission of two TBs, will be bound; and if bundling is not performed, all cells configured for the UE, which support the transmission of two TBs, will not be bound. At present, since the situation where one TB contains multiple CBGs is introduced, the number of CBGs contained in each TB may be different for different cells. Therefore, in this embodiment, whether cells are bound may be independently configured based on cells. For example, a cell 1 in a CG 1 supports the transmission of two TBs, each TB contains four CBGs, and PDSCHs of each time slot generate 8 bits of HARQ-ACK information; and a cell 2 in the CG 1 supports the transmission of two TBs, each TB contains eight CBGs, and PDSCHs of each time slot generate 16 bits of HARQ-ACK information. In this case, if spacial bundling is not performed on the cell 1 in the CG 1, PDSCHs of each time slot generate 8 bits of HARQ-ACK information, and if spacial bundling is performed on the cell 2 in the CG 1, PDSCHs of each time slot after spacial bundling generate 8 bits of HARQ-ACK information. In this way, the number of bits of HARQ-ACK information generated by PDSCHs of each time slot for the cell 1 and the cell 2 in the CG is the same, and the number of bits of HARQ-ACK information may be dynamically determined by DL DAIs in unit of PDCCHs.

In this embodiment, the determination of the number of bits of HARQ-ACK information in each CG by the Method 3 of determining the number of bits of HARQ-ACK information in one CG is described. That is, the UE receives a signaling from the base station, which configures the determination of the number of bits of HARQ-ACK information in each CG by the Method 3. The specific implementation of HARQ-ACK transmission is as follows:

the UE determines the number of bits of HARQ-ACK information in each CG by a way of subgrouping cells in the CG; and the higher-layer signaling received by the UE from the base station configures at least two downlink cells (for example, N cells, where N is a positive integer and is greater than or equal to 2), at least one of which is configured to provide PUCCHs of uplink time slots for transmitting the HARQ-ACK. N downlink cells configured in this way belong to one CG. That is, HARQ-ACK information for the N downlink cells is transmitted on PUCCHs of uplink time slots for one cell. The N downlink cells are divided into two subgroups by configuring by the higher-layer signaling, i.e., subgroup 1 and subgroup 2, respectively (there is no superposition between cells in the subgroup 1 and cells in the subgroup 2, that is, any one of the N cells belongs to either the subgroup 1 or the subgroup 2 and is impossible to belong to both the subgroup 1 and the subgroup 2). There are N1 cells in the subgroup 1 and N2 cells in the subgroup 2 (N1+N2=N, N1>=0 and N1<=N, and N2>=0 and N2<=N). HARQ-ACK information for cells in the subgroup 1 is semi-statically determined, and HARQ-ACK information for cells in the subgroup 2 is dynamically determined.

For cells in the subgroup 1, the number of bits of HARQ-ACK information in the subgroup 1 is determined by the following method.

The number of bits of HARQ-ACK information for the UE is semi-statically determined. For example, 2 downlink cells are configured in the subgroup 1, and there are 4 bundling windows for each downlink cell. That is, HARQ-ACK information corresponding to 4 downlink time slots for each cell is transmitted in one uplink time slot, and the number of bits of HARQ-ACK in each downlink time slot for each cell is 1. In this case, the total number of bits of HARQ-ACK information for cells in the subgroup 1 is 2*4=8 bits, as shown in FIG. 14. For cells in the subgroup 1, HARQ-ACK information may be bound for all cells which can be bound in the subgroup (for example, cells supporting the transmission of two TBs), because the approximate number of bits of HARQ-ACK information is not required for different cells in the subgroup.

For cells in the subgroup 2, the number of bits of HARQ-ACK information in the subgroup 2 is determined by the following method.

The number of bits of HARQ-ACK information for the UE is dynamically determined based on counter DL DAIs and sum DL DAIs in PDCCHs received by the UE, the counter DL DAIs and the sum DL DAIs are specific to only PDCCHs of cells in the subgroup 2 (for example, both the counter DL DAI field and the sum DL DAI field are 2 bits), and correspondence between values for counter DL DAIs and sum DL DAIs and the number of PDCCHs which schedule PDSCHs and indicate SPS release is as shown in Table 3. Wherein N (N is a positive integer) in the Table 3 is related to the number of cells supported by the UE.

TABLE 3

Mapping relation between values for counter DL DAIs and sum DL DAIs and the number of PDCCHs which schedule PDSCHs and indicate SPS release

| MSB, LSB for counter DL DAIs and sum DL DAIs | Values for counter DL DAIs and sum DL DAIs | The number of PDCCHs which schedule PDSCHs and indicate SPS release |
|---|---|---|
| 0, 0 | 1 | 1, or 5, or 9, . . . , 4N-3 |
| 0, 1 | 2 | 2, or 6, or 10, . . . , 4N-1 |
| 1, 0 | 3 | 3, or 7, or 11, . . . , 4N-1 |
| 1, 1 | 4 | 0, or 4, or 8, . . . , 4N |

For example, 2 cells are configured in the subgroup 2, and HARQ-ACK information for the 2 cells is transmitted in one uplink time slot. The number of bits of the counter DL DAI field is 2, and the number of bits of the sum DL DAI field is 2. It is assumed that the transmission mode of a cell 3 supports the transmission of two TBs and one TB contains 4 CBGs each generating one bit of HARQ-ACK information, that is, the number of bits of HARQ-ACK information corresponding to one downlink time slot for the cell 3 is 8; and it is assumed that the transmission mode of a cell 4 supports the transmission of two TBs and one TB contains 8 CBGs each generating one bit of HARQ-ACK information, that is, the number of bits of HARQ-ACK information corresponding to one downlink time slot for the cell 8 is 16, as shown in FIG. 15. Spacial bundling may be performed on HARQ-ACK information for the cell 4, and the number of bits of HARQ-ACK information for one downlink time slot for the cell 4 after spacial bundling is 8. In this way, counter DL DAIs and sum DL DAIs in unit of PDCCHs are used in the subgroup 2. The total number of bits of HARQ-ACK transmitted on PUCCHs of one uplink time slot may be obtained based on counter DL DAIs and sum DL DAIs received by the UE. FIG. 16 shows the counter DL DAIs and sum DL DAIs in PDCCHs received by the UE. The UE receives total 5 PDCCHs, wherein values for counter DL DAIs are 1, 2, 3, 4, 1, respectively, and values for sum DL DAIs are as specifically follows: the sum DL DAI of one PDCCH received in the first time slot is 1, the sum DL DAI of two PDCCHs received in the second time slot is 3, and the sum DL DAI of two PDCCHs received in the fourth time slot is 1. It may be calculated that total 5 PDCCHs are received, PDSCHs scheduled by each PDCCH generate 8 bits of HARQ-ACK information, and the total number of bits of HARQ-ACK information is 5*8=40. For cells in the subgroup 2, HARQ-ACK information may be bound for each cell in the subgroup by independently determining whether to perform spacial bundling (for example, whether spacial bundling is performed on each cell is configured by an independent higher-layer signaling), because the approximate number of bits of HARQ-ACK information is required for different cells in the subgroup.

In this way, the total number of bits of HARQ-ACK information for cells in the subgroup 1 is 8 bits, the total number of bits of HARQ-ACK information for cells in the subgroup 2 is 40 bits, so the total number of bits of HARQ-ACK information in the CG is 8+40=48 bits.

The forgoing description merely shows preferred embodiments of the present application and is not intended to limit the present application. Any modification, equivalent replacement or improvement made in the spirit and principle of the present application shall fall into the protection scope of the present application.

Embodiment 5

The embodiments of the present disclosure further provide a user equipment, the user equipment includes:

a subgroup determination module 1710 configured to determine, based on a received signaling, subgroups of cells in a cell group and a way of determining the number of bits of HARQ-ACK information corresponding to each subgroup;

a first bit number determination module 1720 configured to determine, based on the way of determining the number of bits of HARQ-ACK information corresponding to each subgroup, the number of bits of HARQ-ACK information for each subgroup of cells in the cell group; and a second bit number determination module 1730 configured to obtain, based on the number of bits of the HARQ-ACK information for the each subgroup of cells, the number of bits of HARQ-ACK information for the cell group for transmitting the HARQ-ACK information.

Further, the way of determining the number of bits of HARQ-ACK information by the subgroup determination module 1710 includes at least one of the following:

semi-statically determining the number of bits of the HARQ-ACK information; and
  dynamically determining the number of bits of the HARQ-ACK information.

Still further, the subgroup determination module 1710 is specifically configured to bind the number of bits of HARQ-ACK information corresponding to downlink time slots for cells configured to be bound in the subgroups when the number of bits of the HARQ-ACK information is dynamically determined.

Further, the subgroup determination module 1710 is specifically configured to divide cells in a cell group into two subgroups based on the received signaling, semi-statically determine the number of bits of HARQ-ACK information for the first subgroup, and dynamically determine the number of bits of HARQ-ACK information for the second subgroup.

Further, for the first subgroup, the first bit number determination module 1720 is specifically configured to: acquire the number of cells in the subgroup, the number of downlink time slots for each cell transmitting HARQ-ACK information in a uplink time slot and the number of bits of HARQ-ACK information corresponding to each downlink time slot; and calculate, based on the number of cells, the number of downlink time slots for each cell and the number of bits of HARQ-ACK information corresponding to each downlink time slot, the number of bits of the HARQ-ACK information for the subgroup.

Further, for the second subgroup, the first bit number determination module 1720 is specifically configured to: determine, based on DL Downlink Assignment Indexes (DAIs) in received Physical Downlink Control Channels (PDCCHs), the total number of received PDCCHs; and calculate, based on the number of PDCCHs and the number of bits of HARQ-ACK information corresponding to each configured PDCCH, the number of bits of the HARQ-ACK information for the subgroup.

Optionally, the subgroup determination module 1710 is further specifically configured to bind, based on the received signaling, the number of bits of HARQ-ACK information corresponding to downlink time slots for cells which may be bound in the first subgroup.

Optionally, the subgroup determination module 1710 is further specifically configured to bind, based on the received signaling, the number of bits of HARQ-ACK information corresponding to downlink time slots for cells configured to be bound in the second subgroup.

The embodiments of the present disclosure further provide a base station, comprising:

a configuration module 1810 configured to configure subgroups of cells in a cell group and a way of determining the number of bits of HARQ-ACK information corresponding to each subgroup so that a UE determines the number of bits of HARQ-ACK information for each subgroup of cells in the cell group;
  a sending module 1820 configured to send a signaling carrying the subgroups; and
  a receiving module 1830 configured to receive HARQ-ACK information which is transmitted by the UE based on the number of bits of HARQ-ACK information for the cell group.

Further, the configuration module 1810 is specifically configured to divide cells in a cell group into two subgroups;
  configure to semi-statically determine the number of bits of HARQ-ACK information for the first subgroup; and
  configure to dynamically determine the number of bits of HARQ-ACK information for the second subgroup.

Wherein, the determination way includes at least one of the following:
  semi-static determination and dynamic determination.

Still further, the configuration module 1810 is further configured to:
  determine, based on the number of bits corresponding to downlink time slots for each cell, cells in which the number of bits of HARQ-ACK information needs to be bound by the UE; and
  in this case, the configuration module 1810 is specifically configured to: configure cells which may be bound in the first subgroup; and
  configure cells to be bound in the second subgroup.

FIG. 19 is a block diagram illustrating the structure of a user equipment according to another embodiment of the present disclosure.

Referring to the FIG. 19, the user equipment 1900 may include a processor 1910, a transceiver 1920 and a memory 1930. However, all of the illustrated components are not essential. The user equipment 1900 may be implemented by more or less components than those illustrated in FIG. 19. In addition, the processor 1910 and the transceiver 1920 and the memory 1930 may be implemented as a single chip according to another embodiment. The processor 1910 may correspond to subgroup determination module 1710, first bit number determination module 1720 and second bit number determination module 1730 of FIG. 17.

The aforementioned components will now be described in detail.

The processor 1910 may include one or more processors or other processing devices that control the proposed function, process, and/or method. Operation of the user equipment 1900 may be implemented by the processor 1910.

The processor 1910 may sense each configured resource pool and/or each group of resources to obtain a result of sensing, the result of sensing containing a set of remaining candidate single TU resources of each resource pool. The processor 1910 may select, from the set of remaining candidate single TU resources of each resource pool and/or each group of resources, one candidate single TU resource as a transmission resource.

The transceiver 1920 may include a RF transmitter for up-converting and amplifying a transmitted signal, and a RF receiver for down-converting a frequency of a received signal. However, according to another embodiment, the transceiver 1920 may be implemented by more or less components than those illustrated in components.

The transceiver 1920 may be connected to the processor 1910 and transmit and/or receive a signal. The signal may include control information and data. In addition, the transceiver 1920 may receive the signal through a wireless channel and output the signal to the processor 1910. The transceiver 1920 may transmit a signal output from the processor 1910 through the wireless channel.

The memory 1930 may store the control information or the data included in a signal obtained by the device 1900. The memory 1930 may be connected to the processor 1910 and store at least one instruction or a protocol or a parameter for the proposed function, process, and/or method. The memory 1930 may include read-only memory (ROM) and/or random access memory (RAM) and/or hard disk and/or CD-ROM and/or DVD and/or other storage devices.

FIG. 20 is a block diagram illustrating the structure of a device for a base station according to another embodiment of the present disclosure.

Referring to the FIG. 20, the device for the base station 2000 may include a processor 2010, a transceiver 2020 and a memory 2030. However, all of the illustrated components are not essential. The base station 2000 may be implemented by more or less components than those illustrated in FIG. 20. In addition, the processor 2010 and the transceiver 2020 and the memory 2030 may be implemented as a single chip according to another embodiment. The processor 2010 may correspond to the configuration module 1810 of FIG. 18. The transceiver 2020 may correspond to the sending module 1820 and the receiving module 1830 of FIG. 18.

The aforementioned components will now be described in detail.

The processor 2010 may include one or more processors or other processing devices that control the proposed function, process, and/or method. Operation of the base station 2000 may be implemented by the processor 2010.

The processor 2010 may determine the locations of transmission resources and reception resources.

The transceiver 2020 may include a RF transmitter for up-converting and amplifying a transmitted signal, and a RF receiver for down-converting a frequency of a received signal. However, according to another embodiment, the transceiver 2020 may be implemented by more or less components than those illustrated in components.

The transceiver 2020 may be connected to the processor 2010 and transmit and/or receive a signal. The signal may include control information and data. In addition, the transceiver 2020 may receive the signal through a wireless channel and output the signal to the processor 2010. The transceiver 2020 may transmit a signal output from the processor 2010 through the wireless channel.

The memory 2030 may store the control information or the data included in a signal obtained by the base station 2000. The memory 2030 may be connected to the processor 2010 and store at least one instruction or a protocol or a parameter for the proposed function, process, and/or method. The memory 2030 may include read-only memory (ROM) and/or random access memory (RAM) and/or hard disk and/or CD-ROM and/or DVD and/or other storage devices.

The implementation principle and the produced technical effects of the user equipment and the base station based on the embodiments of the present disclosure are the same as those of the method embodiment described above. As briefly described, the parts which are not mentioned here may refer to corresponding content in the method embodiments described above, and will not be repeated here.

It should be understood by those skilled in the art that the present disclosure involves devices for carrying out one or more of operations as described in the present disclosure. Those devices can be specially designed and manufactured as intended, or can comprise well known devices in a general-purpose computer. Those devices have computer programs stored therein, which are selectively activated or reconstructed. Such computer programs can be stored in equipment (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. In other words, the readable media comprise any media storing or transmitting information in an equipment (for example, computer) readable form.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It should be understood by those skilled in the art that the steps, measures and solutions in the operations, methods and flows already discussed in the present disclosure may be alternated, changed, combined or deleted. Further, other steps, measures and solutions in the operations, methods and flows already discussed in the present disclosure can also be alternated, changed, rearranged, decomposed, combined or deleted. Further, the steps, measures and solutions of the prior art in the operations, methods and flows disclosed in the present disclosure can also be alternated, changed, rearranged, decomposed, combined or deleted.

The above are embodiments of the present disclosure, and are not used for limiting the protection scope of the present disclosure. Any modifications, equivalents, improvements, etc., made under the spirit and principle of the present disclosure, are all included in the protection scope of the present disclosure.

What is claimed is:

1. A method performed by a user equipment (UE) in a wireless communication system, the method comprising:
    receiving, from a base station, a higher-layer signaling including information related to hybrid automatic repeat request-acknowledgement (HARQ-ACK) information for a cell group of a serving cell;
    receiving, from the base station, a physical downlink control channel (PDCCH) including downlink control information (DCI) for scheduling a physical downlink shared channel (PDSCH);
    obtaining first HARQ-ACK information for a first sub-group of the cell group based on a first manner; and second HARQ-ACK information for a second sub-group of the cell group based on a second manner based on the higher-layer signaling;
    obtaining third HARQ-ACK information based on the first HARQ-ACK information and the second HARQ-ACK information;
    identifying resource for a physical uplink control channel (PUCCH) based on a resource set for the PUCCH and a field indicating PUCCH resource included in the DCI; and
    transmitting, to the base station, the PUCCH including the third HARQ-ACK information based on the resource for the PUCCH,
    wherein in case that a number of bits of the third HARQ-ACK information is less than or equal to 2, a first PUCCH resource set is used for the PUCCH,
    wherein in case that the number of bits of the third HARQ-ACK information is greater than 2, a second PUCCH resource set is used for the PUCCH, and wherein the field indicating the PUCCH resource is different from a transmission power control (TPC) field for the PUCCH included in the DCI.

2. The method of claim 1, wherein the information related to HARQ-ACK information indicates the first manner or the second manner.

3. The method of claim 1, further comprising:
determining a PUCCH power adjustment value for the third HARQ-ACK information based on the TPC field included in the DCI.

4. The method of claim 1, further comprising:
semi-statically determining a set of all of downlink timeslots that need to transmit the HARQ-ACK information on an uplink subframe.

5. The method of claim 1, wherein the first HARQ-ACK information is determined semi-statically based on the first manner and the second HARQ-ACK information is determined dynamically based on the second manner.

6. The method of claim 1, wherein the number of bits of the third HARQ-ACK information is a sum of a number of bits of the first HARQ-ACK information and a number of bits of the second HARQ-ACK information.

7. A user equipment (UE) the UE comprising:
a transceiver; and
at least one controller coupled with the transceiver and configured to:
receive, from a base station, a higher-layer signaling including information related to hybrid automatic repeat request-acknowledgement (HARQ-ACK) information for a cell group of a serving cell,
receive, from the base station, a physical downlink control channel (PDCCH) including downlink control information (DCI) for scheduling a physical downlink shared channel (PDSCH),
obtain first HARQ-ACK information for a first subgroup of the cell group based on a first manner and second HARQ-ACK information for a second subgroup of the cell group based on a second manner based on the higher-layer signaling,
obtain third HARQ-ACK information based on the first HARQ-ACK information and the second HARQ-ACK information,
identify resource for a physical uplink control channel (PUCCH) based on a resource set for the PUCCH and a field indicating PUCCH resource included in the DCI, and
transmit, to the base station, the PUCCH including the third HARQ-ACK information based on the resource for the PUCCH,
wherein in case that a number of bits of the third HARQ-ACK information is less than or equal to 2, a first PUCCH resource set is used for the PUCCH,
wherein in case that the number of bits of the third HARQ-ACK information is greater than 2, a second PUCCH resource set is used for the PUCCH, and
wherein the field indicating the PUCCH resource is different from a transmission power control (TPC) field for the PUCCH included in the DCI.

8. The UE of claim 7, wherein the information related to HARQ-ACK information indicates the first manner or the second manner.

9. The UE of claim 7, wherein the
at least one controller is further configured to:
determine a PUCCH power adjustment value for the third HARQ-ACK information based on the TPC field included in the DCI.

10. The UE of claim 7, wherein the first HARQ-ACK information is determined semi-statically based on the first manner and the second HARQ-ACK information is determined dynamically based on the second manner.

11. The UE of claim 7, wherein the number of bits of the third HARQ-ACK information is a sum of a number of bits of the first HARQ-ACK information and a number of bits of the second HARQ-ACK information.

12. A method, performed by a base station in a wireless communication system, the method comprising:
transmitting, to a user equipment (UE), a higher-layer signaling including information related to hybrid automatic repeat request-acknowledgement (HARQ-ACK) information for a cell group of a serving cell;
transmitting, to the UE, a physical downlink control channel (PDCCH) including downlink control information (DCI) for scheduling a physical downlink shared channel (PDSCH); and
receiving, from the UE, a physical uplink control channel (PUCCH) including HARQ-ACK information based on resource for the PUCCH,
wherein the HARQ-ACK information for the cell group is obtained based on first HARQ-ACK information for a first subgroup of the cell group and second HARQ-ACK information for a second subgroup of the cell group,
wherein the first HARQ-ACK information is obtained based on a first manner and the second HARQ-ACK information is obtained based on a second manner,
wherein the resource for the PUCCH is identified based on a resource set for the PUCCH and a field indicating PUCCH resource included in the DCI,
wherein in case that a number of bits of third HARQ-ACK information is less than or equal to 2, a first PUCCH resource set is used for transmitting the PUCCH,
wherein in case that the number of bits of the third HARQ-ACK information is greater than 2, a second PUCCH resource set is used for transmitting the PUCCH, and
wherein the field indicating the PUCCH resource is different from a transmission power control (TPC) field for the PUCCH included in the DCI.

13. The method of claim 12, wherein the information related to HARQ-ACK information indicates the first manner or the second manner.

14. The method of claim 12, wherein the first HARQ-ACK information is determined semi-statically based on the first manner and the second HARQ-ACK information is determined dynamically based on the second manner.

15. The method of claim 12, wherein the number of bits of the third HARQ-ACK information is a sum of a number of bits of the first HARQ-ACK information and a number of bits of the second HARQ-ACK information.

* * * * *